IIII US009163401B2

(12) United States Patent
Vollebregt et al.

(10) Patent No.: US 9,163,401 B2
(45) Date of Patent: Oct. 20, 2015

(54) RETRACTABLE ROOF

(75) Inventors: Richard Vollebregt, Brantford (CA); Graham McDonald, Brantford (CA); Wayne Lickers, Brantford (CA); Robert Lickers, Brantford (CA)

(73) Assignee: Volco Inc., Brantford (CA)

( * ) Notice: Subject to any disclaimer, the term of this patent is extended or adjusted under 35 U.S.C. 154(b) by 0 days.

(21) Appl. No.: 13/566,699

(22) Filed: Aug. 3, 2012

(65) Prior Publication Data
US 2013/0055649 A1 Mar. 7, 2013

Related U.S. Application Data

(60) Provisional application No. 61/546,829, filed on Oct. 13, 2011, provisional application No. 61/515,197, filed on Aug. 4, 2011.

(51) Int. Cl.
*E04D 1/36* (2006.01)
*E04B 7/16* (2006.01)
(Continued)

(52) U.S. Cl.
CPC ............... *E04B 7/166* (2013.01); *A01G 9/241* (2013.01); *A01G 9/242* (2013.01); *A01G 13/0206* (2013.01); *E04B 7/14* (2013.01); *E04D 13/064* (2013.01)
USPC ......... 52/66; 52/13; 52/18; 52/63; 160/84.01; 160/84.04; 135/96

(58) Field of Classification Search
CPC ........... E04B 7/166; E04B 7/14; E04B 9/001; A01G 9/242; A01G 9/241; A01G 9/14; A01G 9/16; A01G 13/0206; E04D 13/064; E04D 13/16; E04D 13/1606; E04F 10/02; E04F 10/0607; E04H 15/20; E04H 15/18; E04H 15/58
USPC .............. 52/13, 18, 63, 66; 160/84.01, 84.04, 160/84.06, 84.08; 11/13, 18, 63, 66; 135/96, 93, 94, 97, 903, 908
See application file for complete search history.

(56) References Cited

U.S. PATENT DOCUMENTS 313,559 A * 3/1885 Vogel ................................ 52/64
3,510,996 A * 5/1970 Popil ................................ 52/64
(Continued)

FOREIGN PATENT DOCUMENTS

EP 1618782 A 1/2006
EP 2371207 A 10/2011
WO 8904896 A1 6/1989

OTHER PUBLICATIONS

Cardamore, Heather; International Search Report from corresponding PCT Application No. PCT/CA2012/050534; search completed on Oct. 17, 2012.
(Continued)

*Primary Examiner* — Joshua J Michener
*Assistant Examiner* — Matthew Gitlin
(74) *Attorney, Agent, or Firm* — John R. S. Orange; Blake, Cassels & Graydon LLP

(57) ABSTRACT

A retractable roof structure for crop protection includes pitched sections of roof defined by a retractable membrane. The membrane is moved by cables connected to a drive tube with a spring to regulate minimum tension of the cable. The drive system ensures that the membrane adjacent to the drive tube is able to travel the same distance as the second membrane from the drive tube. The rafter contains profiles to allow the stationary end of said membrane to be attached continuously to the rafters to provide a water tight connection. The rafter also contains clips which inhibit vertical, lateral and horizontal movement of the guide wires used to suspend the membrane. The guide wires are supported by flexible cables or nodes. A secondary clear membrane is installed below a white upper retractable membrane.

33 Claims, 34 Drawing Sheets

(51) Int. Cl.
*E04B 7/14* (2006.01)
*E04D 13/064* (2006.01)
*A01G 9/24* (2006.01)
*A01G 13/00* (2006.01)

(56) References Cited

U.S. PATENT DOCUMENTS

| | | | |
|---|---|---|---|
| 4,296,568 A | 10/1981 | Dukes | |
| 4,375,232 A * | 3/1983 | Heescher et al. | 160/84.06 |
| 4,390,054 A * | 6/1983 | Niibori et al. | 160/265 |
| 4,730,633 A | 3/1988 | Greenbaum | |
| 4,805,355 A * | 2/1989 | Plant | 52/1 |
| 5,009,041 A * | 4/1991 | Fly | 52/2.19 |
| 5,265,373 A * | 11/1993 | Vollebregt | 47/17 |
| 5,513,470 A * | 5/1996 | Vollebregt | 52/13 |
| 5,581,954 A * | 12/1996 | Vollebregt | 52/13 |
| 5,653,067 A * | 8/1997 | Lago | 52/90.1 |
| 5,655,335 A * | 8/1997 | Vermeer | 52/66 |
| 5,809,701 A | 9/1998 | Vollebregt | |
| 6,024,153 A * | 2/2000 | Goldman | 160/61 |
| 6,182,737 B1 | 2/2001 | Kuwabara | |
| 6,832,448 B2 | 12/2004 | Stefan | |
| 8,695,281 B2 * | 4/2014 | Dondurur et al. | 52/3 |
| 2002/0038529 A1 * | 4/2002 | Nelson | 52/2.22 |

OTHER PUBLICATIONS

Merckx, Alain; Supplementary European Search Report issued in corresponding EP Application No. EP12820367; search completed Feb. 5, 2015.

* cited by examiner

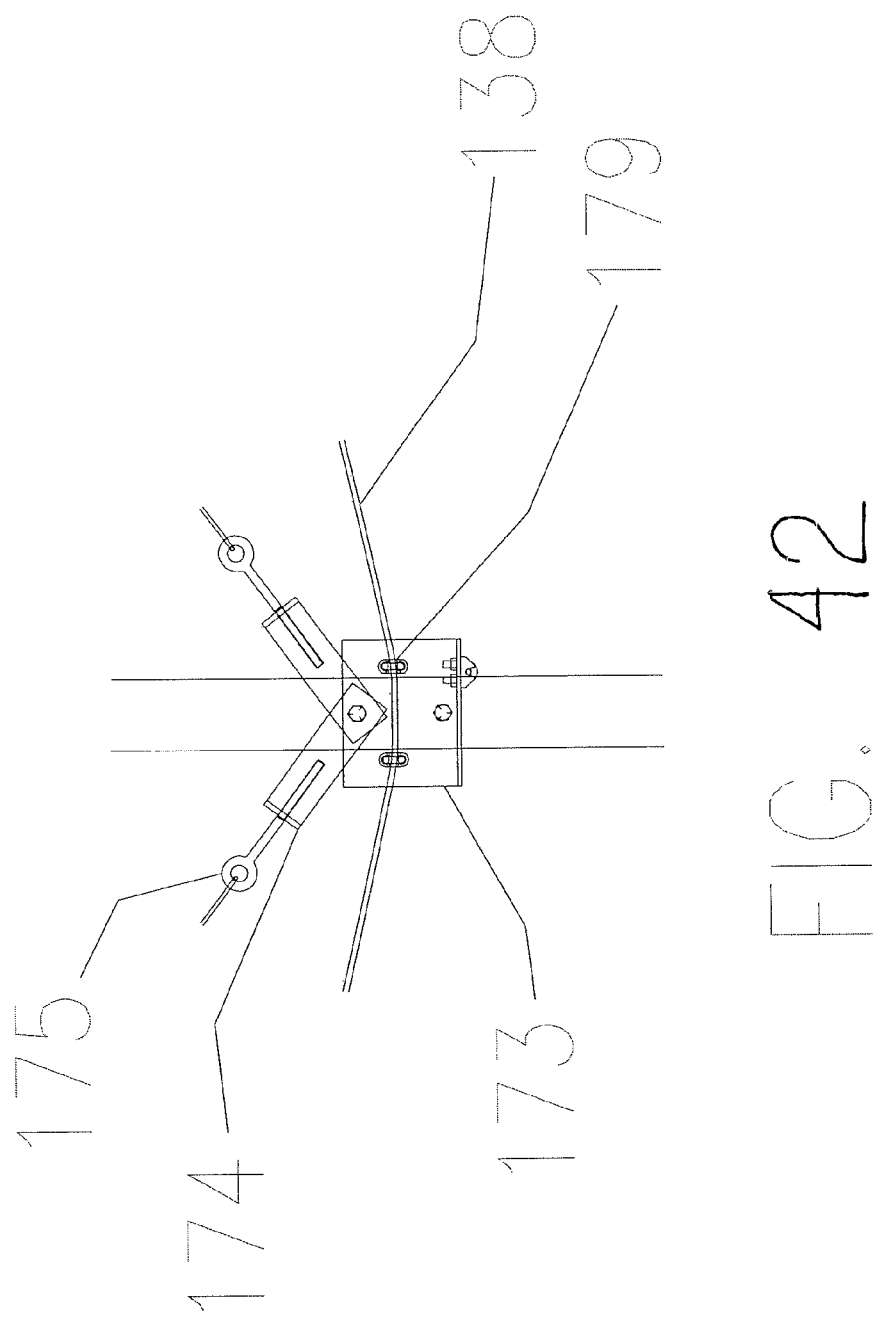

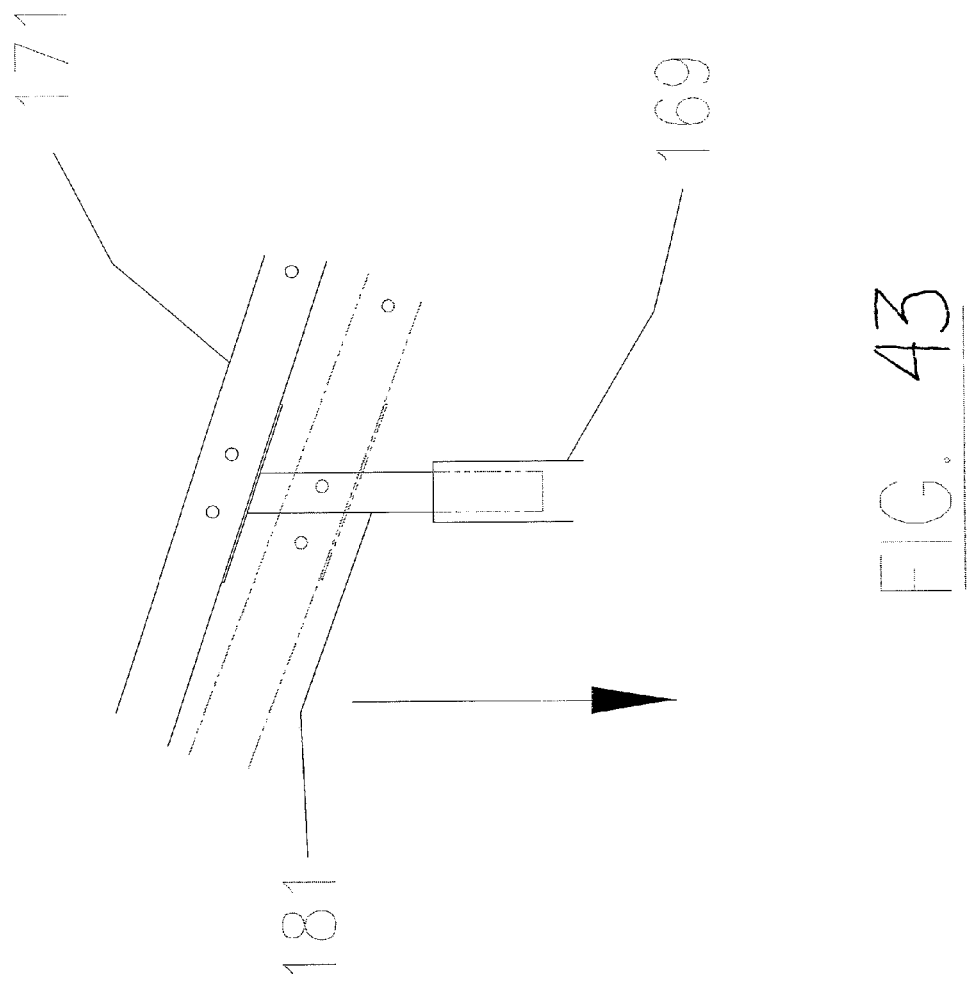

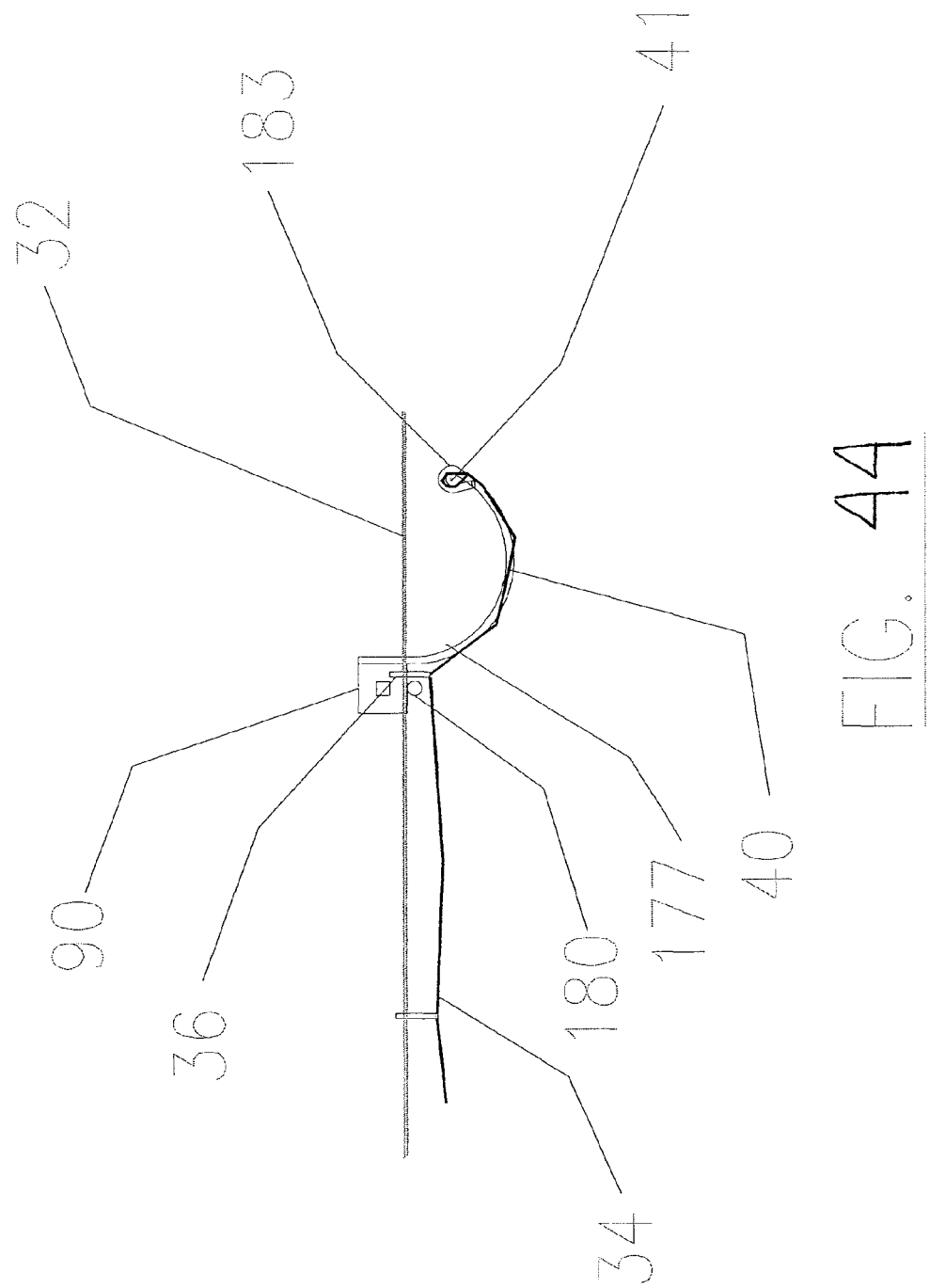

RETRACTABLE ROOF

FIELD OF THE INVENTION

The present invention relates to a retractable roof structure which is generally used to protect crops from adverse climatic conditions.

It is well known to provide protection for crops against adverse climatic conditions by utilizing either a greenhouse structure or by using a curtain arrangement. The greenhouse structure is well known and utilizes a fixed frame that is glazed to allow light to pass through to the growing area and to protect the plants within the greenhouse from the cold. Alternate solution to protect plants is a curtain structure in which large curtains of material may be deployed across the crop to provide shade during the day and to prevent heat loss during the night as previously disclosed in U.S. Pat. No. 5,809,701 issued on Sep. 22, 1998. The curtains are formed as membranes that are supported on wires and extend between adjacent rafter assemblies. Sliding of the membranes between retracted (open) positions and deployed (closed) positions, allows the climate to be maintained. The rafter assemblies may simulate the profile of traditional greenhouse structures to facilitate shedding water, or may be flat where rainfall is not an issue.

Whilst these systems have proven very effective in providing a controlled climate for crops, their use has revealed a number of areas that would benefit from improvement.

In a typical installation, a drive system is used to close and open the series of curtains and generally contains a motor which rotates a round tube supported by bearings. A series of cables extends over one or more membranes and the cables are connected to the drive tube at one end of the structure and pulley at the opposite end. Each membrane is connected to a driving cable, causing each membrane to move conjointly as the drive tube rotated. Generally when the moving edge of the membranes is moving towards the drive system, the roof will be closing to protect crops from adverse weather.

When structures are too large for one drive system, one or more additional drive systems have to be installed on the interior rafters. A series of interior rafters in the same line contains a drive tube to operate cables which move the membranes connected to those cables. The interior rafter also contains a series of pullies for an additional roof drive system which is located on the opposite side of the rafter from the drive tube from the adjacent drive system. The provision of such drive systems on interior rafters may impede operation of the membranes, leading to a lack of closure of the membranes and the adoption of compensation mechanisms.

It has also been found that the loads imposed on the cable during operation may cause the cables which were wrapped on carried by the tubes to lose their alignment.

The installation of the drive tubes on an interior rafter, requires threading cable drums and bearings onto the drive tube as it is fed between the structural components of the roof. This is a time consuming and difficult process due to the weight and awkwardness of the installation process.

The guidewires which support the retractable membrane are supported by rafters made of tubing or a formed steel member with channels located along both edges. The edge of one adjacent membrane is secured to the rafter using fasteners inserted intermittently from above into the channel to pinch the membrane in the channel. During heavy rains, the rain builds up in the channel and overflows onto the crops below. To prevent the overflow from reaching the crops, the membrane section that extends beyond the fastener is secured to the underside of the channel using a different fastener from below. However the structural supports extending from the underside of the rafter prevent the membrane from being secured to the underside of the rafter in such a way so as to create a continuous gutter.

The rafter also contains a series of fasteners which are used to secure the guidewires to the rafter. The guidewires are generally clamped to the rafter using a series of plates which are compressed around the guidewires. The clamping of the guidewires also helps to prevent a cascade of failures throughout each section between the rafters since a break in a guidewire is prevented from causing adjacent sections of said guidewires from going slack. However, the higher wind turbulence at the membrane sections adjacent to the perimeter walls causes a greater oscillation of the membrane and guidewires, resulting in the guidewires breaking due to fatigue. The wires tend to break adjacent to the pair of plates which clamped the guidewires since the oscillation of the wire always occurred directly adjacent to the plates which clamped the wire.

When the membrane is closed to protect plants below from rain, there is no ability to exchange air through the roof surface to help regulate temperature or humidity levels inside of the building.

The rafter which supports the guidewires and membrane is typically a rigid member which is designed to resist wind and snowloads. The rafter is usually strengthened from below by rigid members which are connected either to the posts or to a horizontal member which forms the lower part of a truss. This design is very effective at resisting high wind and snowloads, but at a great cost. When covering large areas in warmer climates, the structure does not need to resist snow or high wind loads and these regions frequently are located in developing countries where financing of capital investments is difficult so total material and construction costs must be minimized. When covering large areas of land, the land is frequently not flat or level resulting in the need for the structure to be able to be adjustable to fit the changes in the grade.

It is therefore an object of the present invention to obviate or mitigate one or more of the above disadvantages.

BRIEF DESCRIPTION OF THE DRAWINGS

Embodiments of the invention will now be described by way of example only with reference to the accompanying drawings, in which

FIG. 2a is a plan view of another example embodiment of an aperture;

FIG. 42 is a view of an alternative connection of rafters to post;

FIG. 43 is a schematic representation of a post construction to accommodate variations in height; and FIG. 44 is a view showing an arrangement of bracket to inhibit chafing of a covering.

DETAILED DESCRIPTION OF THE INVENTION

Figure 1:
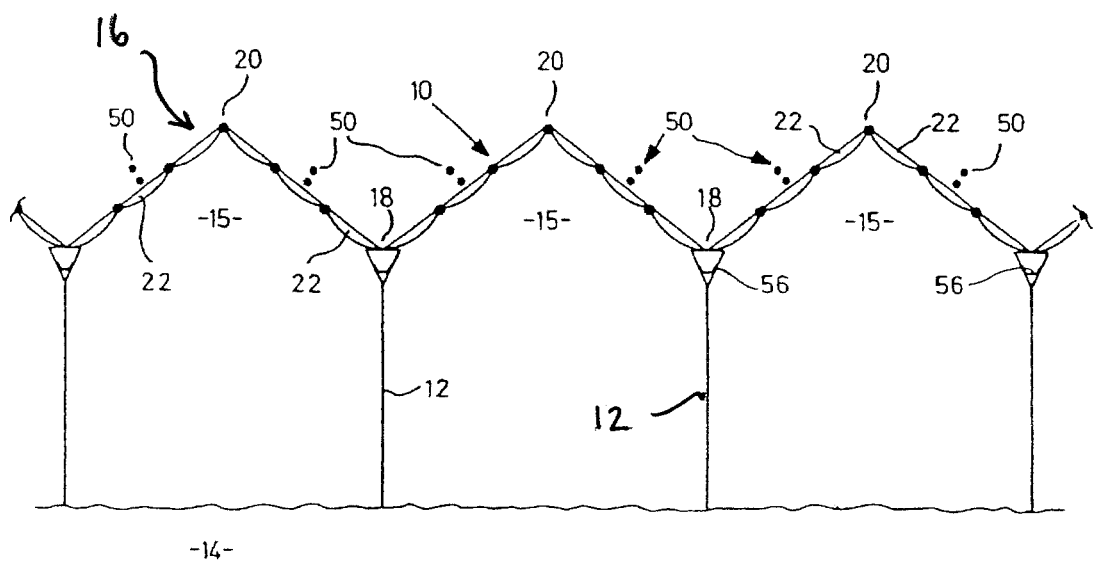
FIG. 1 is an end elevation of a roof structure.

Referring therefore to FIG. 1, a retractable roof structure including a roof 10 supported on vertical posts 12 to cover a crop growing area 14. The roof 10 includes spaced parallel rafter assemblies 16 that extend from one side of the crop growing area 14 to the other and are supported on the posts 12. The rafter assembles extend along the length of the crop growing area. The rafter assembles include a pair of end walls 16a, 16b delimiting the roof structure and intermediate rafter assemblies 16 between the end walls.

The roof 10 is formed as a series of gables 15 with valleys 18 alternating with peaks 20. The number of gables will vary depending upon the width of the area 14 and may terminate either at a valley or peak depending upon the installation.

Figure 4:
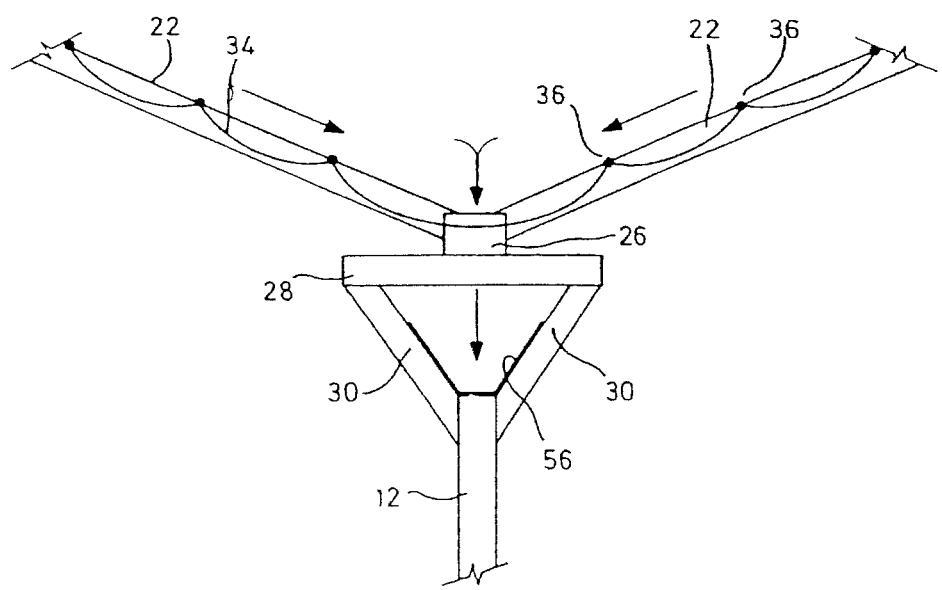
FIG. 4 is an end view of the portion of the roof structure shown in FIG. 3.
Figure 14:
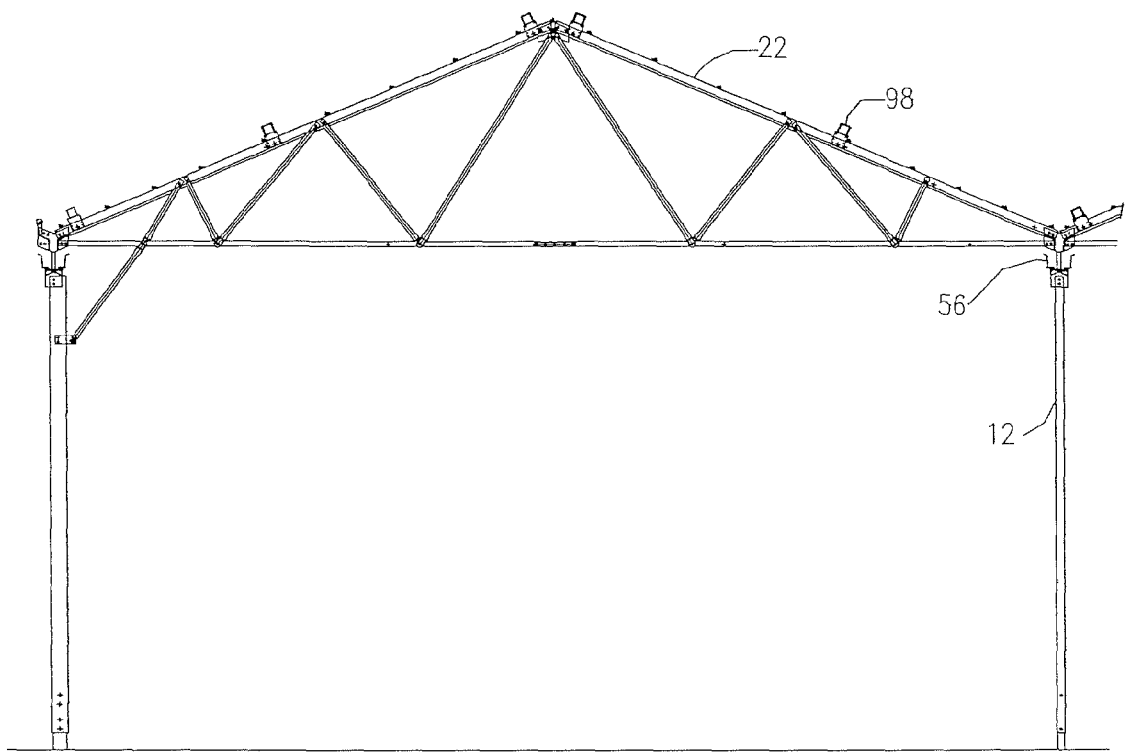
FIG. 14 is an end view of a truss used in the structure of FIG. 1.

The rafter assemblies 16 define the gables 15 and thus the valleys 18 and peaks 20. Each rafter assembly 16 includes 3 pairs of oppositely directed rafters 22 extending from adjacent the valleys 18 to the peak 20 to define gable 15. The rafters 22 are connected to the posts 12 in the valleys 18 to define the rafter assembly 16. Each of the rafters 22 is formed from a structural square section tubing typically of galvanized steel tubing and is connected in the valley 18 to a bracket 26 by pins 24 as seen in FIG. 4. The bracket 26 extends upwardly from a horizontal support member 28 which in turn is supported by a pair of inclined members 30 that extend from the opposite ends of the support member 28 to the top of the 10 post 12. A triangular aperture is thus formed between the support member 28 and the inclined members 30 at the top of the post with the rafters 22 being supported above the post 12. As explained more fully below with respect to FIGS. 26 to 39, the post 12 could also be a rod or cable installed under tension for structural designs where the posts extend up to the peak instead of being positioned under the gutter. The distal end of the rafters 22 at the peak 20 are similarly connected through pins and brackets to the adjacent rafter. The rafter assembly 16 shown utilizes a pair of rafters but, as can be seen in FIG. 14, a truss may also be used to support the rafter. Alternatively, additional posts 12 may be provided at the peak 20 for structural support. The exact form of rafter assembly is determined by the required wind and snow load and the overall structural design.

Each of the rafters 22 supports a series of guidewires 32 that extend perpendicular to the rafter assembly 16 and generally parallel to one another. The guidewires 32 are secured to each of the rafters 22 at spaced locations and are pretensioned so as to be able to support a predetermined load. Purlins 98 extend between the rafters to provide additional rigidity to the assembled structure when required.

Figure 2:
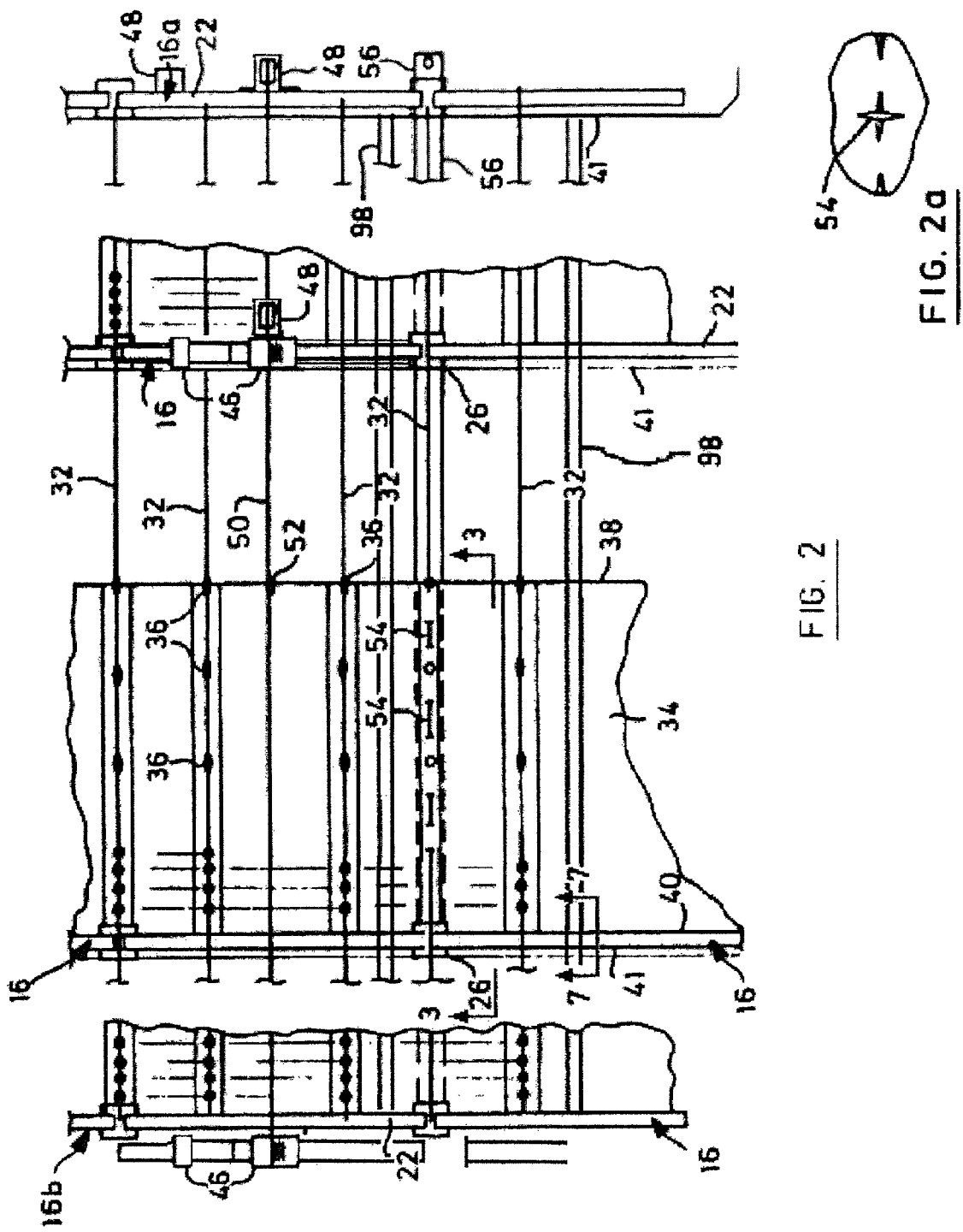
FIG. 2 is a plan view of a portion of the roof structure shown in FIG. 1.
Figure 5:
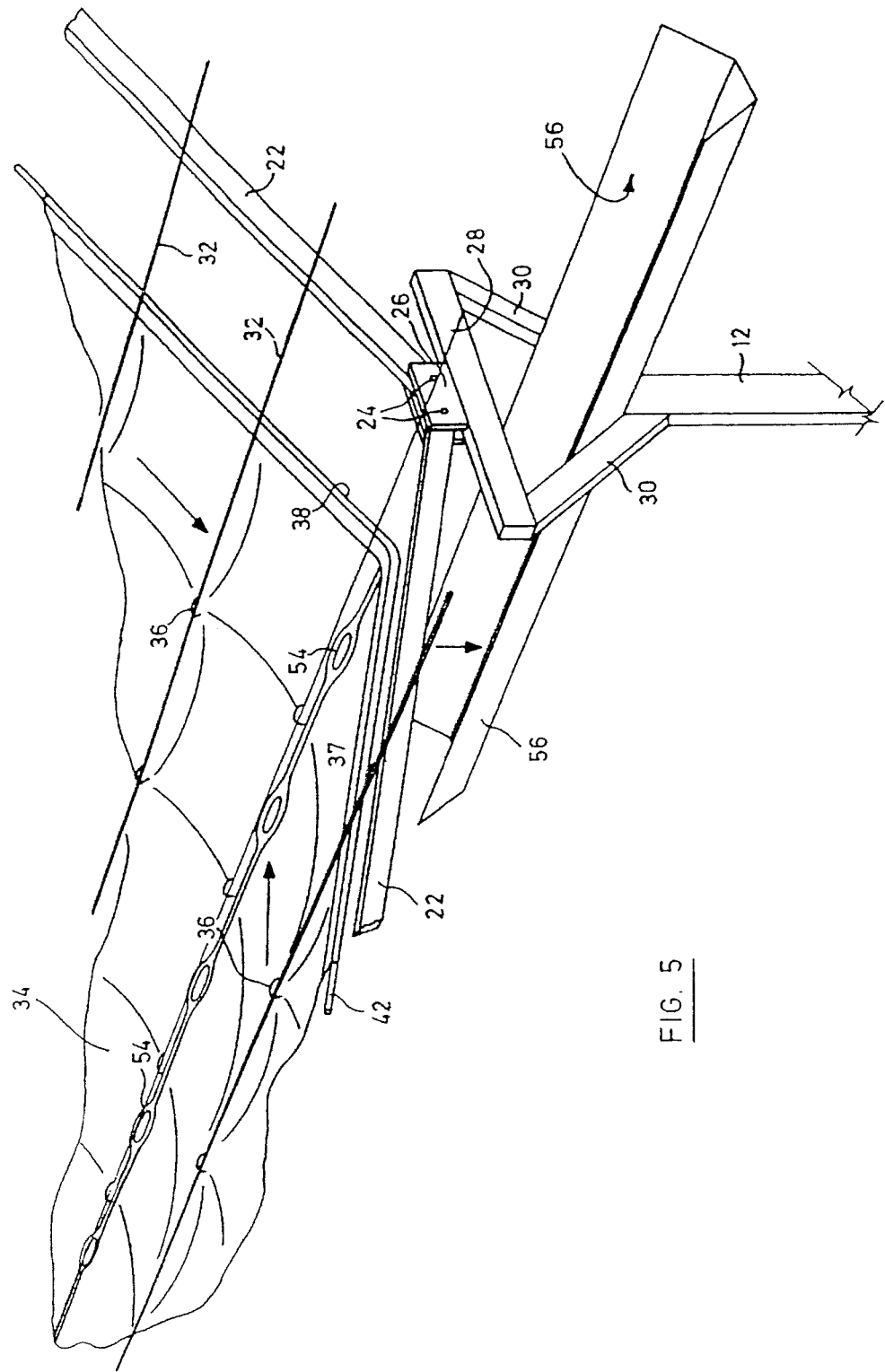
FIG. 5 is a perspective view of a portion of the roof structure shown in FIGS. 1-4.
Figure 6:
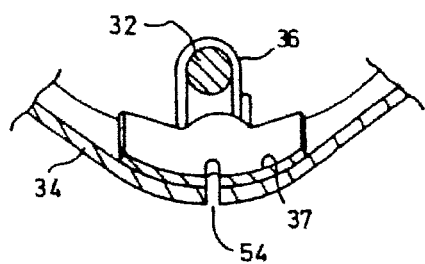
FIG. 6 is a view on an enlarged scale on the line 4 of FIG. 3.

As can best be seen in FIG. 2, the guidewires 32 are uniformly spaced along the rafters 22 between the peaks 20 with one of the guidewires 32 being located at the peak 20 at the connection between adjacent rafters 22. It will also be noted from FIGS. 5 and 6 that a guidewire 32 may be provided at the valley 18 and will be on either side of the valley 18. The guidewires 32 may be attached to the rafters 22 by any convenient manner such that relative movement between adjacent rafters is opposed by the guidewires. Particularly useful forms of attachments are described in greater detail below with reference to FIGS. 22 to 24.

The guidewires 32 slidably support sections of a flexible roof membrane, indicated generally at 34, which is typically formed from a fabric having the required characteristics to control the environment in the crop growing area 14. A suitable fabric is impermeable to water but allows the transmission of light to the growing area 14. As shown in detail in FIG. 6, the membrane 34 is attached to the guidewires 32 by hooks 36 which are secured in tapes 37 sewn to the membrane 34 and are free to slide along the wire 32. The nature of the hooks and their attachment to the wire and to the membrane is well known and need not be described further at this time.

The membrane 34 includes a leading edge 38 and a trailing edge 40 with the membrane deployed between adjacent rafter assemblies 16 to cover the area between the rafter assemblies. As can be seen from FIG. 5, the leading edge 38 also includes a rigid tube 42 that conforms to the shape of the rafters 22 and so defines the profile of the leading edge 38 of the roof membrane 34. This ensures alignment between the rafters 22 and the leading edge 38.

Figure 7:
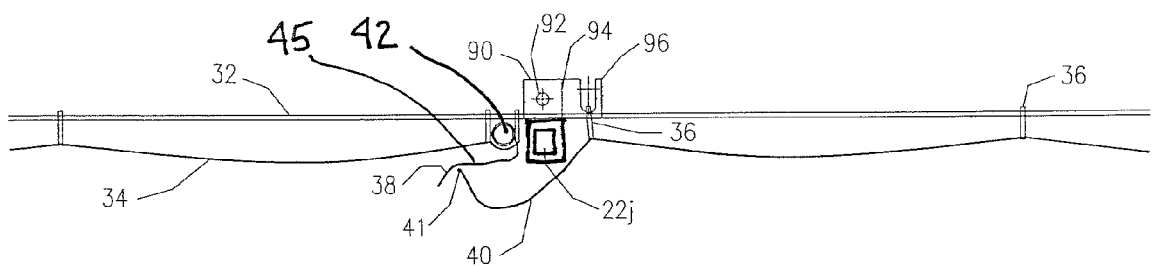
FIG. 7 is a view on the line 7-7 of FIG. 2.

The trailing edge 40 is secured to its rafter assembly 16 and the leading edge 38 is formed to provide a seal when it is positioned adjacent its respective rafter assembly. As seen in FIG. 7, the trailing edge 40 of the membrane 34 is secured at one end to the rafter 62 by a support wire 41 extends parallel to but spaced from the rafter 22 and is located by brackets 43. The end 40 is secured to the wire by clips.

A plate 90 is provided to inhibit movement of the trailing edge 40 relative to the rafter 62. The plate 90 contains an extension 96 which has a notch 97 to receive a hook 36. Engagement of the hook 36 in the notch 97 restricts the movement of the hook 36 relative to the rafter 22. The hook 36 is positioned on the membrane to provide sufficient material to pass beneath the rafter 22 and provide a trough in which water can accumulate and drain. Upon deployment of the membrane 34, the notch 97 limits movement of the hook 36 and so the trough formed by the trailing edge 40 is maintained.

The tube 42 is spaced from the leading edge 38 sufficiently to provide a flap 45 that depends from the leading edge. When deployed, the flap 45 of the adjacent membrane 34 engages the wire 41 holding the trailing edge 40. In this way a continuous seal is provided along the rafters 22 when the membrane is deployed and water running off the leading edge 38 will be collected in the trough formed beneath the rafter 22 by the trailing edge 40.

As noted above, a membrane 34 is located between each pair of rafters 22 and is free to slide along the guidewires 32 between a retracted position in which the leading edge 38 is brought close to the trailing edge 40 and a deployed position in which the leading edge extends to the adjacent rafter assembly 16 and the membrane 34 covers the crop growing area 14. In the retracted position the roof membrane 34 assumes a folded or pleated configuration which will progressively unfold one pleat at a time as the membrane 34 is moved to the deployed position. In the deployed position, the membrane will be generally fully extended. Although the membrane 34 will generally be taut to inhibit flapping of the material, troughs running parallel to the rafters 22 will be formed between the locations at which the membrane 34 is secured to the cables 32. It will also be understood that the areas between adjacent pairs of rafter assemblies 16 each have their respective sections of membrane 34 so that one section of membrane extends across the width of the roof 10 between adjacent rafter assemblies 16 but the whole area is covered by several sections of the roof membrane 34 arranged in series along the length of the roof.

To avoid the accumulation of water in the valleys 18, the membrane 34 is formed with apertures 54 in the portion of the membrane 34 that passes through the valley 18. An aperture 54 is provided between each of the locations at which the hooks 36 secure the membrane 34 to the wires 32 so as to be centrally located with respect to the troughs formed in the deployed position.

Apertures 54 are formed in the preferred embodiment as slits in the membrane extending parallel to and along the valley 18. The formation of the apertures 54 as a slit also inhibits the air flow through the aperture 54. The edges defining the slit will tend to abut one another when the membrane 34 is deployed and so form an effective seal. However, when water accumulates in the valley 18 the edges of the slit will be forced apart to allow water to pass through the aperture 54. Typically the slits are in the order of 1.0 inch long with a span between hooks 36 of 14 inches. This has been found adequate to accommodate heavy rainfall but extreme climatic conditions may dictate larger apertures.

In certain conditions it may be preferable as shown in FIG. 2a to provide the aperture as a pair of intersecting slits so that a larger aperture is provided. This can then accommodate occasional debris such as leaves that otherwise might block the aperture.

The apertures 54 are aligned with the lowest point of the valley 18 so as to be centred above the posts 12. To collect water passing through the apertures 54, a gutter 56 is supported on the post 12 between the inclined members 30. The gutter 56 extends from one end of the roof to the other beneath each of the rafter assemblies 16 and collects water passing through the apertures 54. The gutter extends to the end of the building where the water is discharged through a down pipe 58. To facilitate drainage, the posts 12 are adjusted vertically so a constant fall is provided from one end of the roof to the other allowing the water in the gutter 56 to drain effectively to the down pipe 56. The gutter 56 is formed from a rigid extrusion such as aluminum, steel or plastics material. Of course, the gutter 56 may be interrupted along the length of the building to provide down spouts 58 at regular intervals which can then discharge into ground water collection channels if necessary.

The membrane 34 thus provides a climate protection for the ground covering area 14 which is impermeable to water and therefore protects the crop growing area 14 from heavy rain and potential washout. During rain, the water will flow in the troughs that will be formed between the fastening of the membrane 34 to the guidewires 32 and will flow through the aperture 54 into the gutter 56. However, the membrane 34 may be retracted under favourable climatic conditions to avoid the excessive heat gain normally associated with closed structures, or may be deployed during parts of the day to provide the shade required for crops in the growing area 14. The provision of the apertures 54 and the gutter 56 supported on the post 12 or by the rafter 22 provides an effective drainage system for water shed by the roof and thereby permits an impermeable membrane to be used and avoids damage to the crops or excessive loads being imposed on the roof.

Figure 3:
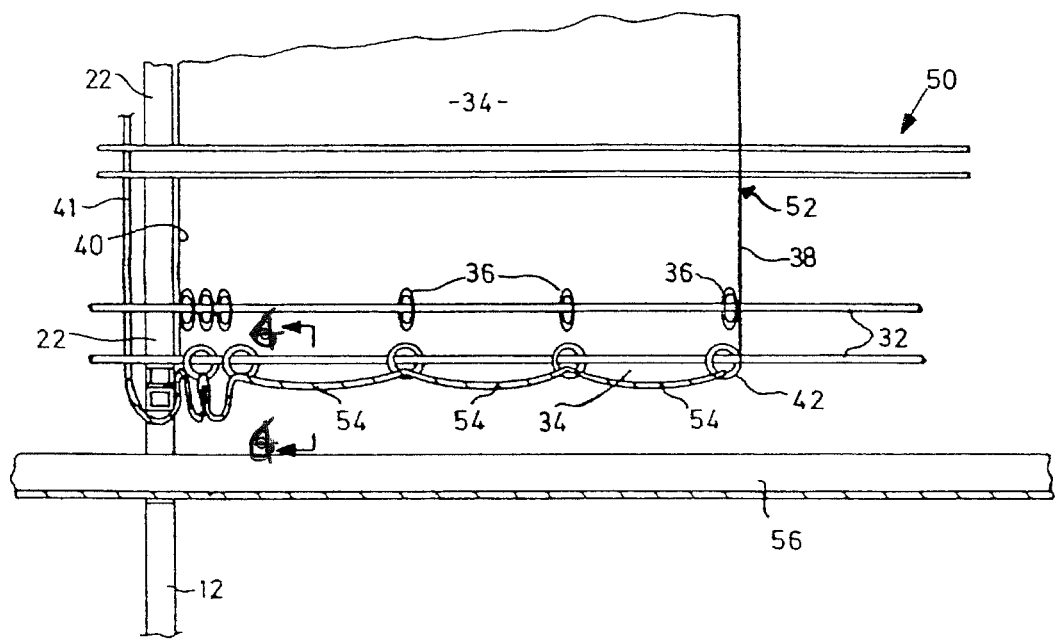
FIG. 3 is a section on the line 3-3 of FIG. 2.

The membranes 34 may be moved between retracted and deployed positions by various means, including manually sliding along the guidewires 32, but it is preferred to provide for a mechanized movement. As noted above, in its simplest form, one drive system is provided that moves all of the membranes in unison. However, for practical implementations, multiple drive systems are required along the length of the roof. Typically, one drive system will move in the order of 20 membranes 34 connected in series to the drive cables. In this regard, a drive system includes a motorized drum 46 (FIG. 2) mounted on a drive tube 114 that is driven by a motor (not shown). The drum 46 drives an endless loop cable 50 having upper and lower runs 51, 53 respectively, that extend from the drum 46, around a pulley 48, and back to the drum 46. The pulley 48 is located on a rafter 22 remote from the drum 46 so the cable spans the required number of rafters 22. The lower run 53 of the loop 50 is secured, as indicated at 52 (FIGS. 2 and 3), to the leading edge 38 of each of the membranes 34 so that each of the leading edges 38 moves with the lower run of the cable 50. Thus upon rotation of the drum 46 in one direction or the other, the cable 50 can be used to move the membranes 34 between retracted and deployed positions with each of the membranes 34 being moved in unison. In order to distribute loads, each tube 114 will carry a number of drums spaced apart along the tube so each membrane is connected to and moved by a plurality of cables disposed across the width of the membrane.

Figure 8:
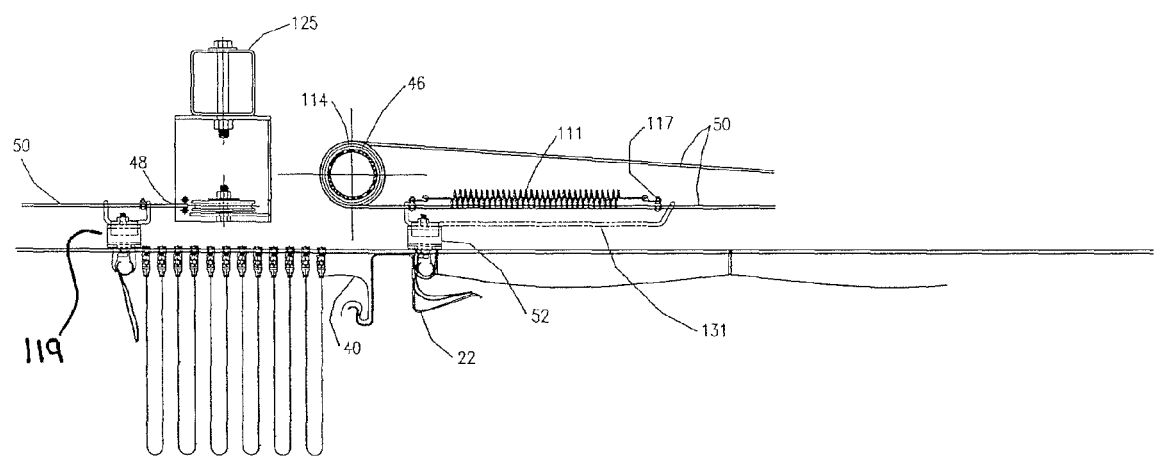
FIG. 8 is a view of a drive system installation on an intermediate rafter.

During such movement, the loads placed on the cables may cause the lower run to lose tension. As can be seen in FIG. 8, to prevent cables 50 from becoming loose on the drum 46, a spring 111 is connected to the lower cable 50 using clamps 116 and 117 adjacent to the drum 46. The clamps 116 and 117 are spaced apart a distance greater than the free length of the spring 111, so the spring acts to pull the excess cable 50 inbetween them, causing the tension of cable 50 between the spring 111 and the drum 46 to be maintained. A lost motion connection is provided to connect the drive cable 50 to the leading edge of the membrane 34. The lost motion connection is provided by a bracket 131 with upturned ends. Apertures 130 in the ends allow sliding movement of the bracket 131 relative to the cable 50. The ends are spaced apart to slightly greater than the spacing between the changes 116, 117 and the bracket 131 is directly connected to the clamp 52. Movement of the lower run 53 of cable 50 is transferred to the clamp 52 by abutment of clamps 116, 117, with the ends of brackets 131 and thus accommodates changes in length of the drive cable 50 to ensure uniform movement of each of the membranes 34.

In order to accommodate multiple drive systems along the length of the roof, it is necessary to provide support for the drive tubes 114 and putties 48 adjacent rafters located intermediate the end gables. As can be seen in FIG. 8, a structural tube 125 which supports the drive system is located above and parallel to the rafter 122 for structural support.

Figure 9:
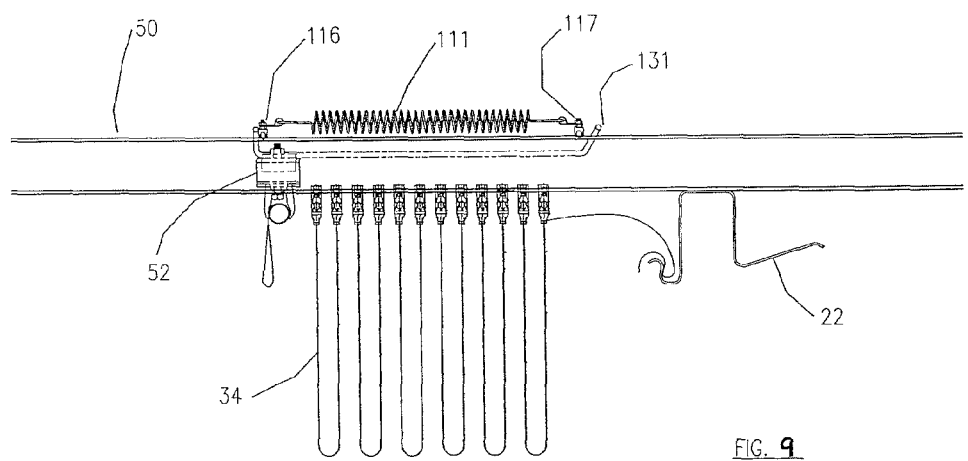
FIG. 9 is a view similar to FIG. 8 adjacent to a drive system.

To avoid the potential interference between the bracket 131 and rafter 22, the structural tube 125, which supports the drive systems, is offset from the rafter 22 to one side. Drive tube 114 and drum 46 can then be positioned so that it is generally above the rafter 22 and toward the same side of the rafter as the structured tube 125. The leading edge 38 of the membrane 34 is allowed to fully contact with rafter 22. In FIG. 8, it can also be seen that the pulley 48 and its mounting bracket is positioned above the retracted membrane in such a manner that the pulley 48 does not limit the movement of the leading edge 38 when the roof is fully retracted. In order to allow the pulley 48 to be installed above the membrane 34, the pulley has to be raised up necessitating an additional spacer bracket 119 to make the connection between the cable 50 and the clamp 52. The bracket 131 on FIG. 8 is approximately the same length as the spring 111 since the travel of the leading edge 38 is no longer restricted, eliminating the need to provide a delay between the movement of cable 50 and the leading edge 38. Clamps 116 and 117 still connect spring 111 the cable 50. It can be seen on FIG. 9 that in the retracted position the bracket 131 does not cross the vertical face of the rafter 22 consequently reducing the possibility that the travel of bracket 131 is restricted by the rafter 22. It will be noted in FIGS. 8 and 9 that a different form of rafter 22 to that shown in FIG. 7 is used but it will be appreciated that the rafter 22 can be utilised with the drive arrangement shown in FIGS. 8 and 9.

Figure 10:
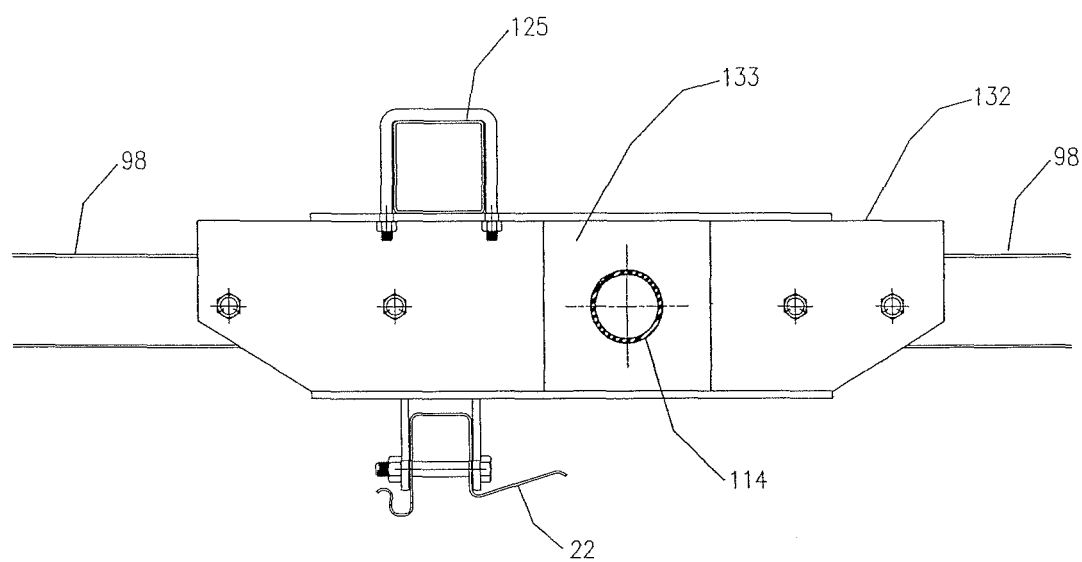
FIG. 10 is a detailed view of a connection between a mount which connects purlins at a rafter and drive tube location.
Figure 11:
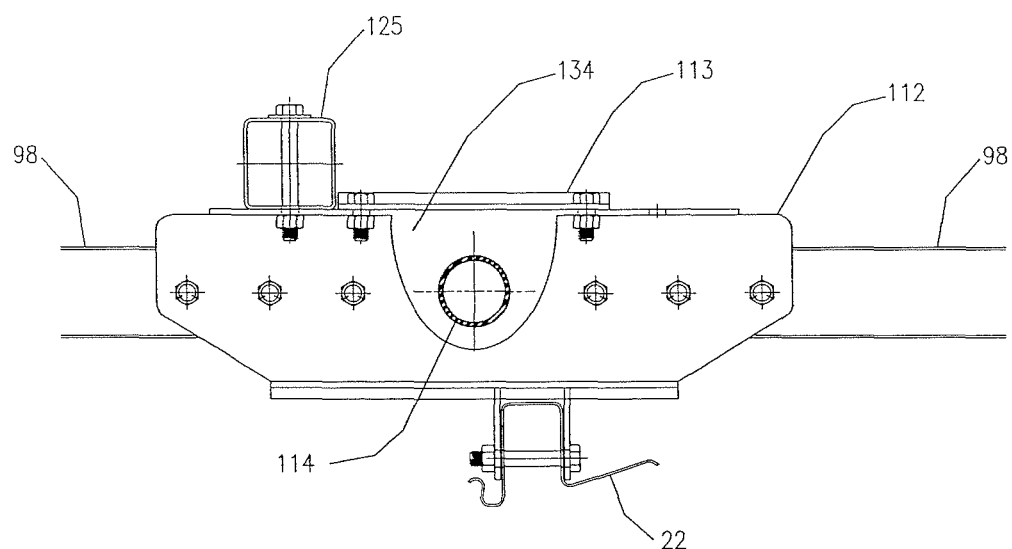
FIG. 11 is a view of an alternative embodiment of FIG. 10.
Figure 12:
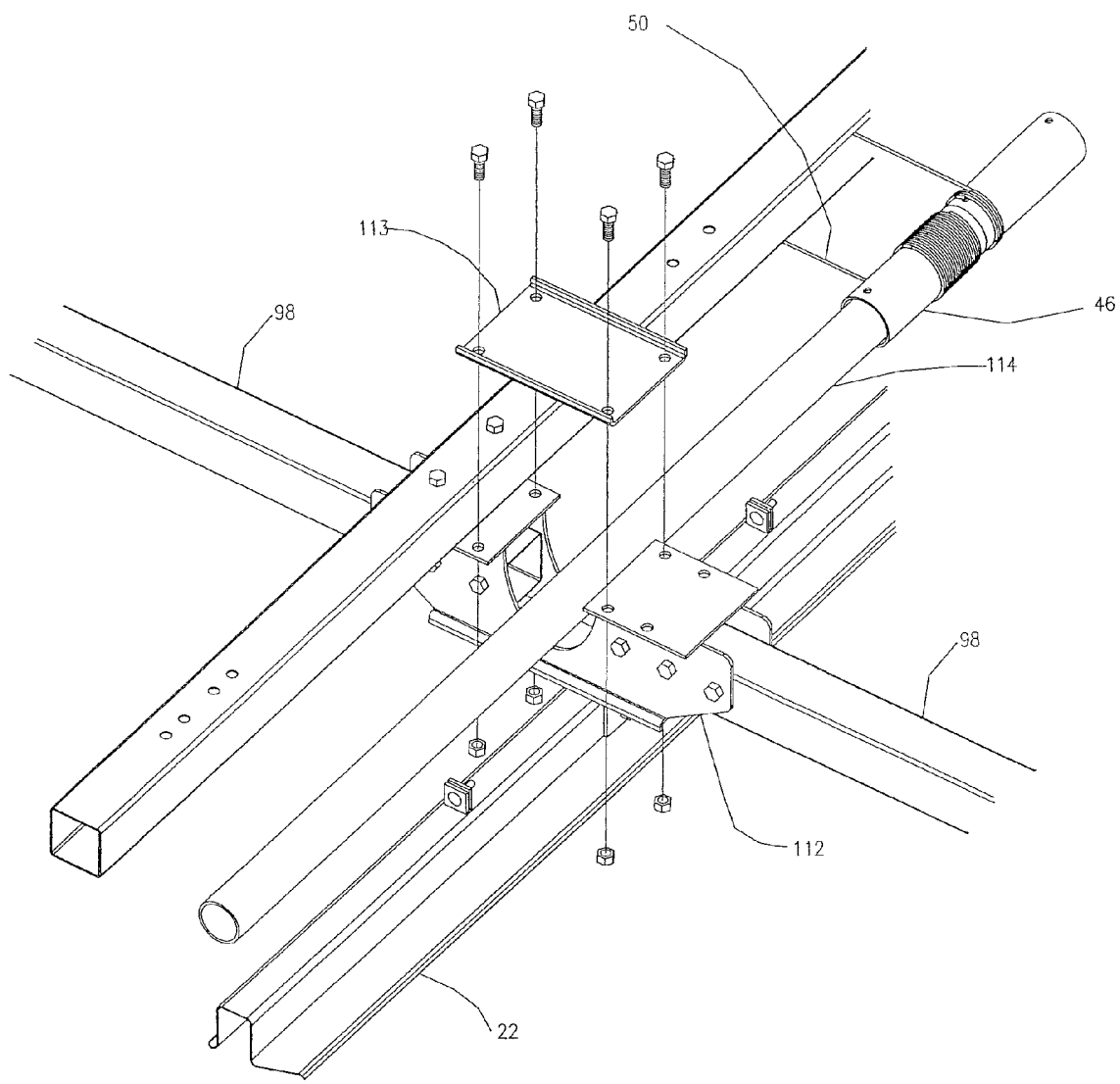
FIG. 12 is an exploded perspective view of the connection shown in FIG. 11.

When a plurality of the drive systems are used along the length of a root, it is necessary to install a drive tube 114 and a motorized drum 46 along a rafter 22 that is distant from a perimeter wall. To maintain the drive cable adjacent to the leading edge of the membrane, the drive tube 114 which powers the cables 50 must intersect the purlin 98. To allow the drive tube 114 to be located continuously from the valley 18 to the peak 20, the purlin 98 contains an aperture to allow the drive tube 114 to pass through the purlin 98. As can be seen in FIG. 10, aperture 133 is made using a closed box through which the drive tube 114 must be fed through during installation. The closed box structure is required as the purlin 98 resists the tension from the guidewires. To facilitate assembly, as can be seen in FIGS. 11 and 12, one or more of the apertures 133 are made using a 3 sided box 112 with an upwardly directed mouth which allows the drive tube 114 to be dropped in place. A separate plate 113 is installed afterwards to close off the fourth side of box 112 and provide the structural integrity when tension is applied to the guidewires 36.

Figure 13:
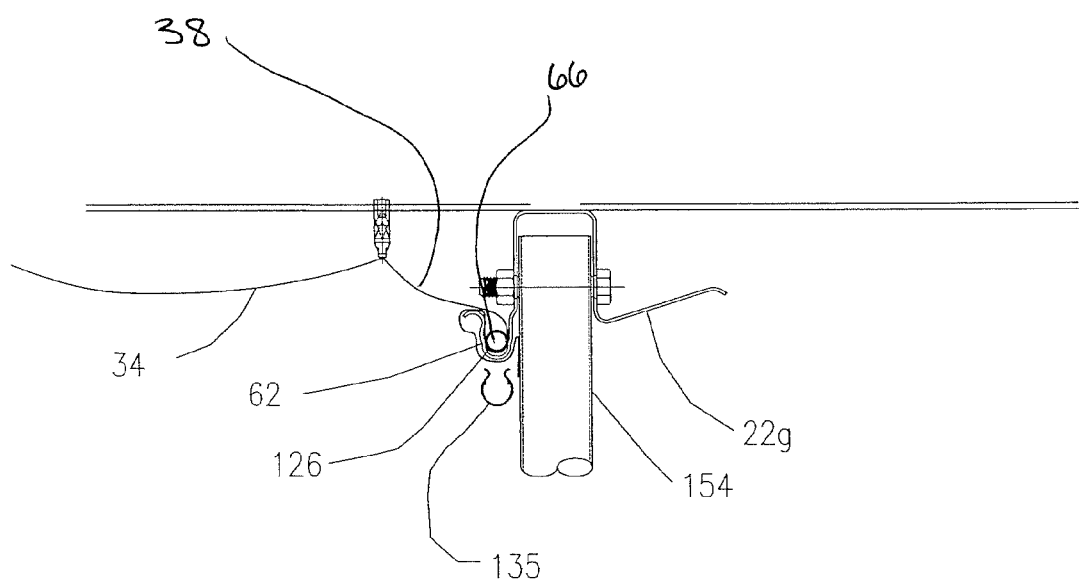
FIG. 13 is a view of a connection of a membrane to a rafter

As noted above, the rafter 22 shown in FIGS. 8 and 9 is of different form, namely a "top hat" shape as shown in FIG. 13. The trailing edge 40 of the membrane 34 is secured to the rafter 22 using wire or tube 66 located in a channel 62. During heavy rain, the rainwater may fill up the space surrounding the wire 66 causing it to overflow. To help prevent the rainwater from reaching the growing area 14, the trailing edge 40 of the membrane 34 is folded under the respective channel 62 and secured to the underside using a clip 135. This helps prevent the rainwater from overflowing to accomate a structural support 154 connected to the rafter, such as is found with a truss configuration in FIG. 14. and permit the trailing edge 40 of the membrane to be clipped in a identical manner so as to create a continuous gutter.

A jog 155 is provided along the vertical leg of the rafter. This creates a space between the channel 62 and the rafter support member 154 to allow the clip 135 to create a continuous gutter from peak 20 to the valley 18 using the trailing edge of the membrane. To further help prevent overflow of the rainwater, the base of the channel 62 is of a different section so the channel 62 diverges from the cross section of the wire 66 to create a spacing 126 from the wire.

Guidewires 32 must be restrained and clamped to the rafter 22 to provide control of the membrane. To reduce fatigue, it has been found that clamps on selected rafter 22 should permit longitudinal movement of the wire but inhibit lateral movement. The clamps on the rafters adjacent to the end walls 16a, 16b have been found to lead to the majority of fatigue related failures and accordingly clamps that permit longitudinal movement are of benefit on those rafters. A suitable form of clamp can be seen in FIG. 16. A plate 90 is welded to the rafter 22 and carries a bolt 92. A pair of clamping jaws 109 are mounted on bolt 92. The faces of the jaws 109 contain a groove 110 having a section slightly greater than that of wire 32. The groove 110 allows for sliding of the guidewire 32 when the plate 90 and complementary jaws 109 are bolted together. This will allow the wire to be restrained from moving vertically or horizontally, but will not prevent the guidewire 32 from moving longitudinally. When the bolt 92 is tightened, the mating jaws are connected to the upstanding plate 90 and the simultaneously compressed together causing the guidewire 32 to be restrained from moving vertically or horizontally, while still allowing the guidewire 32 from moving longitudinally. Such an arrangement has been found to reduce fatigue, particularly at rafters located at the peripheral wall.

Figure 16:
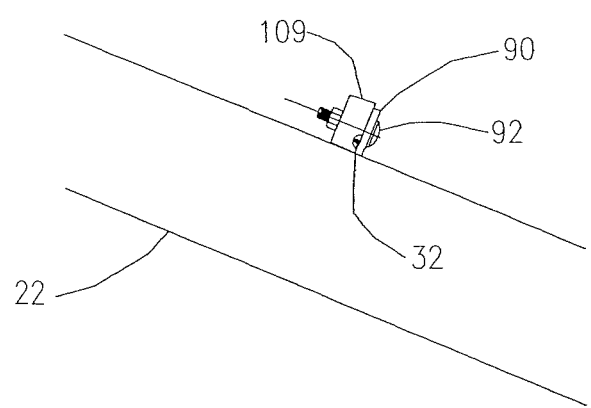
FIG. 16 is view showing a further embodiment of securing guidewires to rafter.

As can be seen in FIG. 16, the same effect can be created using only one of the jaws 109 with a groove 110 and bolting it directly to the upstanding plate 90. To prevent the wearing of the guidewire 32 on the groove of the plate 109, it can be desirable to make the plate 109 out of a self lubricating material like koralloy. It will be appreciated that conventional claims that do not permit longitudinal movement are used on other rafters.

Figure 17:
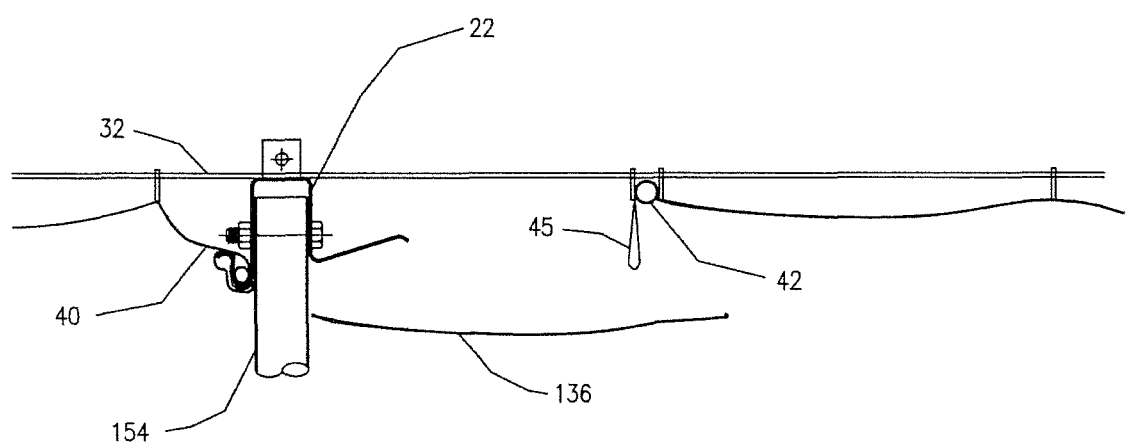
FIG. 17 shows view similar to FIG. 7 showing an alternate structure of membrane.

It is frequently necessary to allow for ventilation through the roof during rainfall to help moderate temperature and humidity levels. As can be seen in FIG. 17, a secondary membrane 136 is installed below and generally parallel to the rafter 22 and adjacent to the members 154 supporting the trusses. One edge of the membrane is supported on the rafter on support trusses 154 and the opposite edge on a support home 156. This secondary membrane 136 extends from the peak 20 connecting to the gutters 56 so that when the roof is closed 90% of the way, the secondary membrane will collect rainwater that enters through the 10% opening in the roof. The secondary membrane 136 is spaced from the membrane 34 sufficiently to allow egress between the membranes 34, 136, but ingress of rain is avoided.

For tropical locations, the supporting structures do not need to be designed for snowloads or high winds rendering the cost of rafters supported by trusses like that shown in FIG. 14 prohibitively expensive. In addition, farmers growing on large fields do not want to grade their land so that it is level simply to facilitate the installation of a greenhouse. To facilitate such constraints an alternative form of rafter assembly as shown in FIG. 18 may be used.

Figure 18:
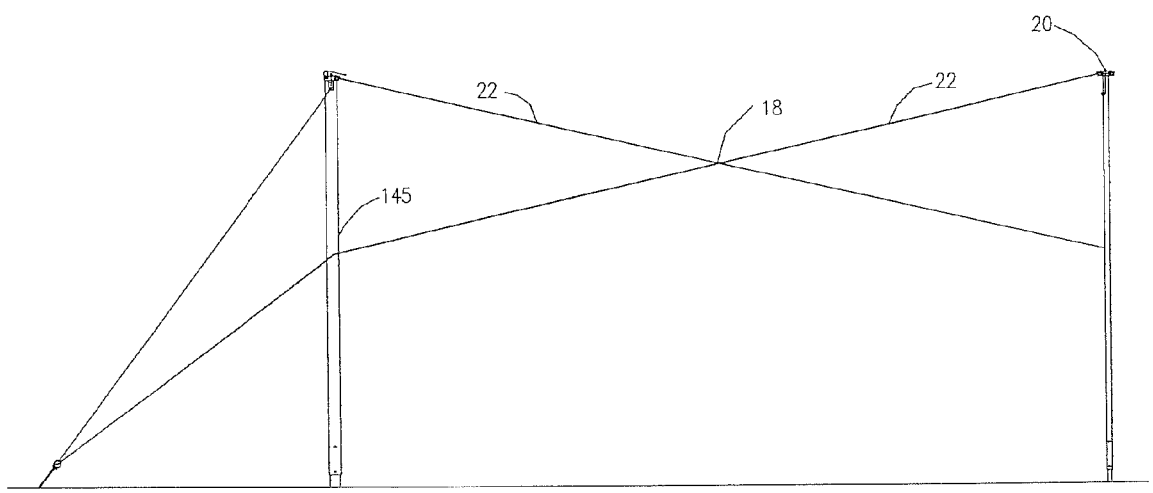
FIG. 18 is an end view of a further embodiment of support structure for a curtain system.
Figure 20:
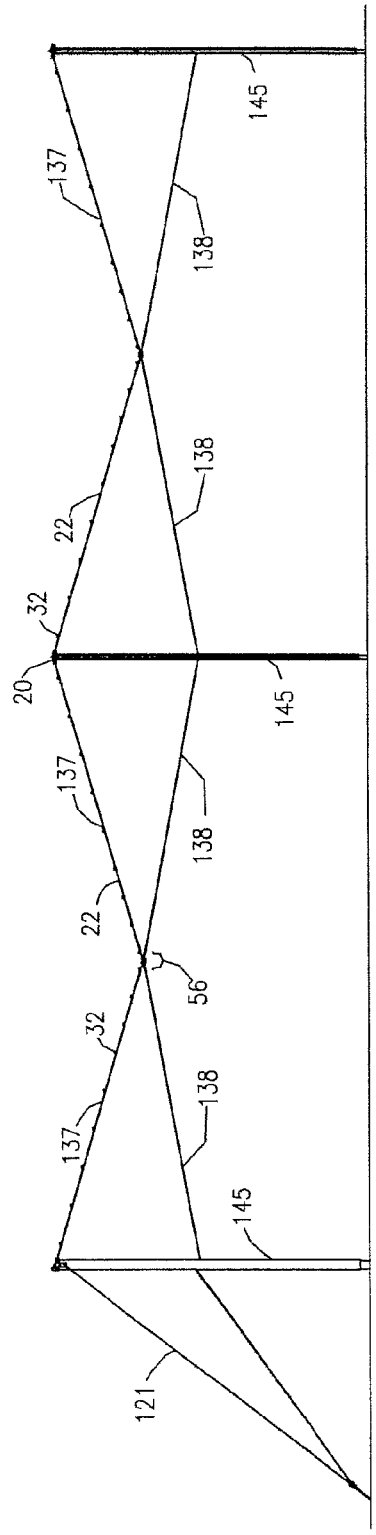
FIG. 20 is an end view similar to FIG. 18 of showing a further embodiment of the support structure for a curtain system.
Figure 21:
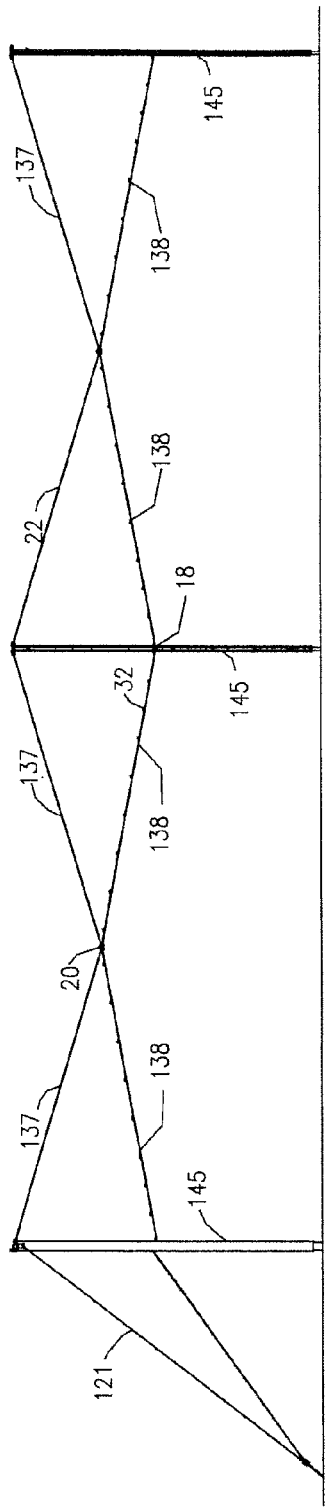
FIG. 21 is an end view similar to FIG. 20. of showing a further embodiment of the support structure for a curtain system.

As can be seen in FIG. 18, the rafters are provided by tension members such as cables or rods extending diagonally down from the peak 20 at one post 145 in opposite directions to a lower point on an adjacent post 145. The valley 18 is formed by the intersection of two rafters. This structure eliminates the use of a post 12 under a valley 18 and instead has the posts located under a peak 20. The intersecting pair of rafters are now acting in tension instead of compression eliminating the need of expensive trusses. As can be seen in FIG. 20, the guidewires 32 are attached to the rafters above the intersection point of the pair of rafters causing the valley to be located midway between the two posts. A gutter 56 can be disposed beneath the valley 18 to collect rainwater which passes through the apertures the membrane 34. FIG. 21 shows another embodiment where the guidewires 34 and membrane 34 are connected to the rafters 22 below the intersection point of the pair of rafters 22. This causes the valley 18 to be at the post 145 and the valley to be at the peak 20 which is opposite that shown in FIG. 21. Consequently the same rafter configuration can be used to drain rainwater at a post or midway between the posts.

Figure 19:
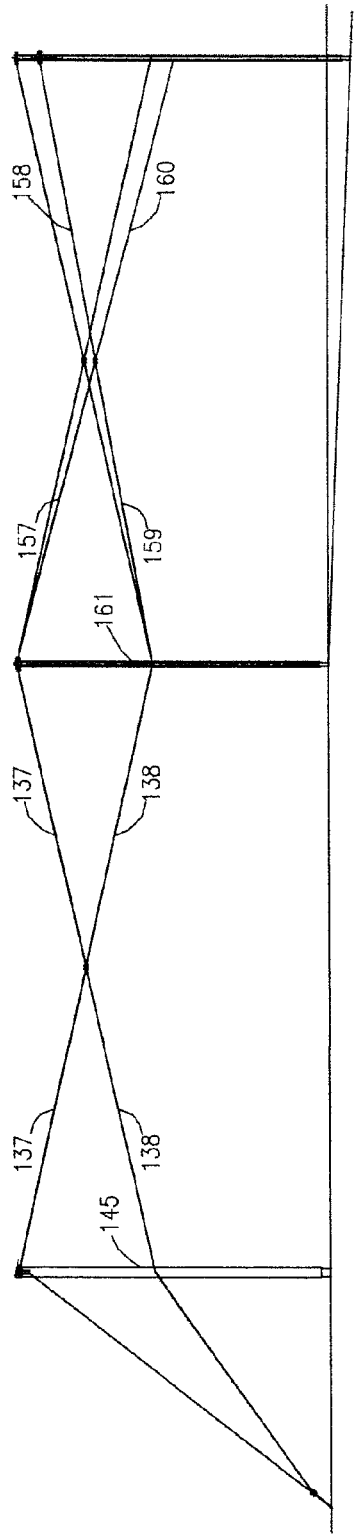
FIG. 19 is an end view similar to FIG. 18 showing multiple rafters on an uneven slope in the land.

FIG. 20 shows the posts 145 installed when the ground as level. The tops of the posts 145 are level resulting in the each pair of upper sections of rafter 137 being the same length along with each lower section 138 being the same length. However, when the top of the one post 145 is not level with adjacent posts 145, as shown in FIG. 19*the* slope of the upper rafter section 157 becomes steeper and the slope of upper section 158 become less steep. Additionally, upper rafter section 157 becomes longer and the corresponding upper section 158 becomes shorter as compared the upper section of rafter 137 when the posts where level. The same applies to the lower rafter sections where 159 is shorter than the other lower rafter section 160. This change in the length of the rafters could result in a change the spacing between the guidewires 32 relative to the tapes 37 and hooks 36 causing a binding of the roof resulting in the drive system no longer being able to move the membrane 34.

Figure 23:
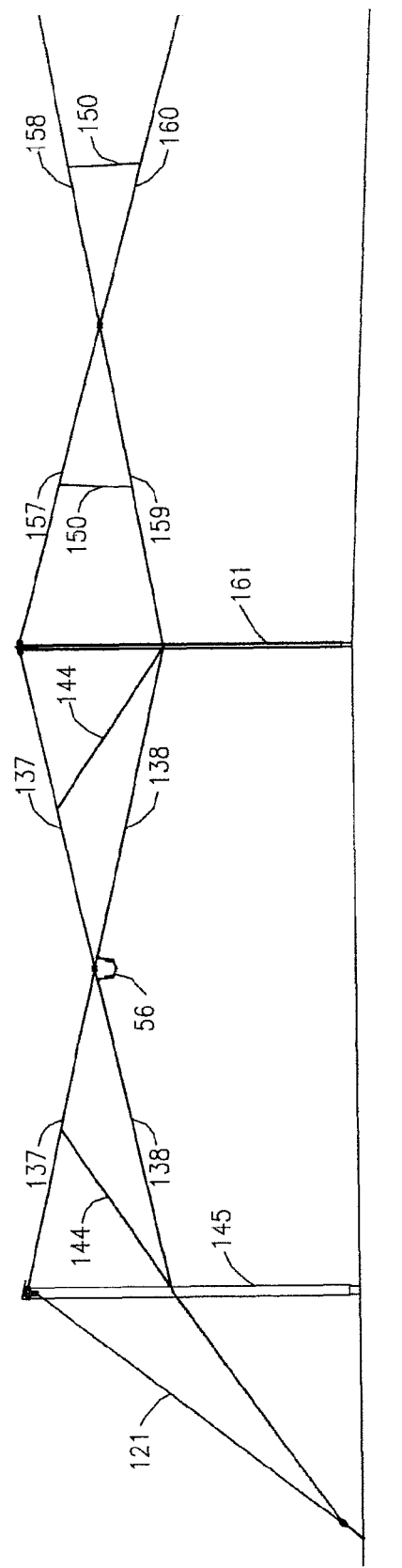
FIG. 23 is a view similar to FIG. 20 showing a further embodiment.

To allow the structure to be installed on a field that is not level, the preferred embodiment is to make each of the rafters 22 in two sections, one of which 137 is of fixed length and the other 138 is of variable length. The connection between the two sections occurs approximately at the intersection point of the two rafters 22 as can be seen in FIG. 23. This design allows the guidewires 32 to be connected to the fixed length sections 137 of the rafters 22 with the distance between the guidewires not changing regardless of whether the tops of the adjacent posts are level or not.

Figure 25:
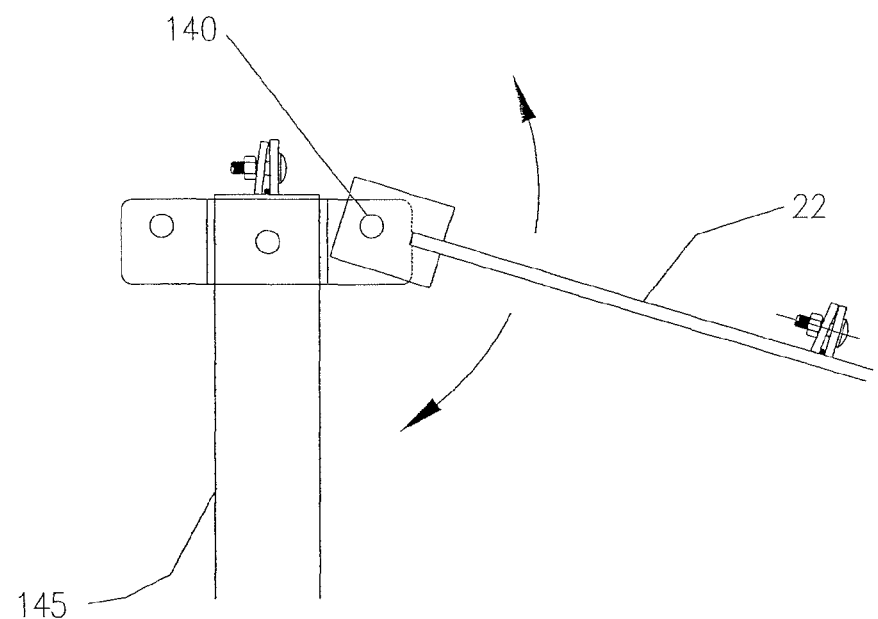
FIG. 25 is a detail view of FIG. 23 showing a connection rafter to peak post.
Figure 27:
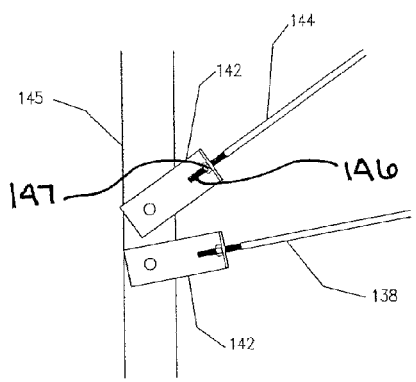
FIG. 27 is a detail view of FIG. 23 connection of rafter with adjusting device to post and additional diagonal member connecting with upper section of mating rafter.
Figure 34:
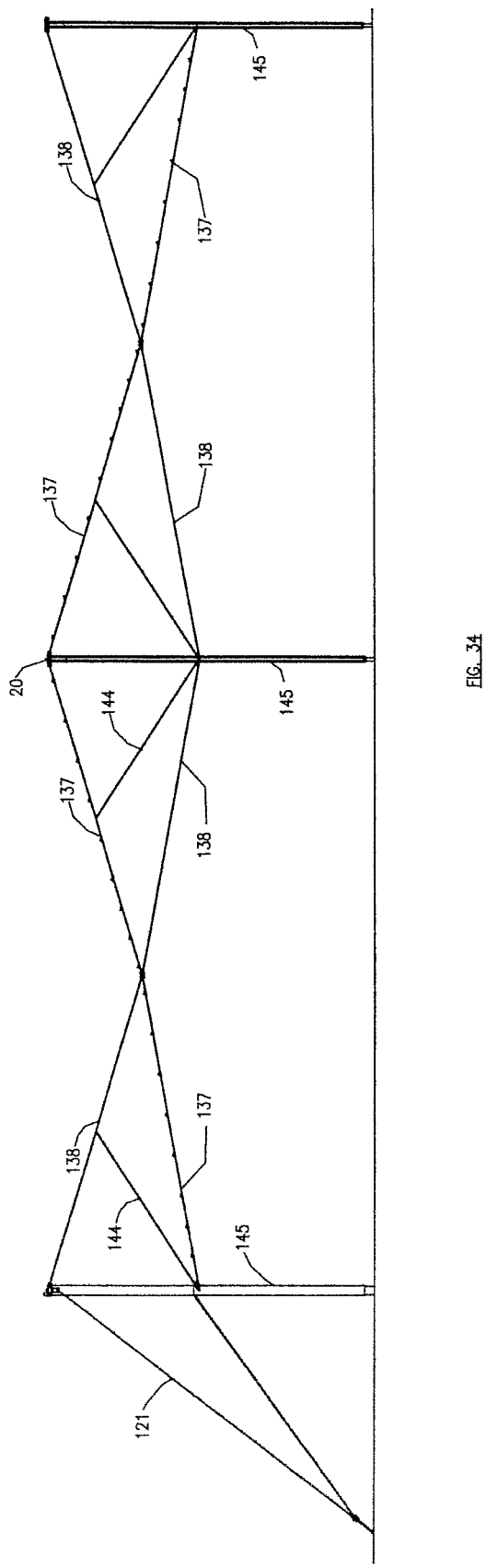
FIG. 34 is a view similar to FIG. 20 showing a further embodiment.

As can be seen in FIG. 25, the upper end of the rafter 22 is connected to the post 145 with the pin and clevis 140 which allows the upper end of the rafter 22 to rotate relative to the post. The connection of the fixed length section 137 and variable length section 138 is shown in FIG. 34. A pin 139 passes through clevis 140 to connect the sections, and may also connect the clevis rafters to one another at their intersection between the two rafter assemblies 137 and 138. In order to compensate for the change in the height of the posts 145, the lower section 138 of the rafter 22 needs to be shortened or lengthened if the connection point to the post 145 is fixed. This can be accomplished by having a threaded section 146 on the lower end of the lower rafter section 138 secured with a nut 147 to a plate 142 as shown in FIG. 27.

Figure 31:
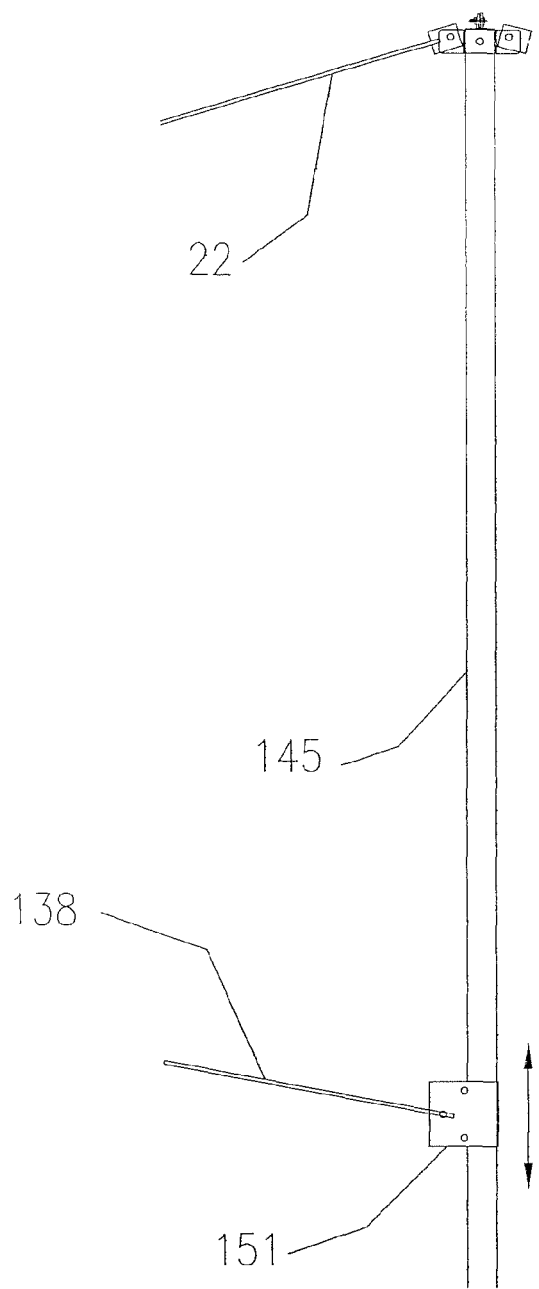
FIG. 31 is a view similar to FIG. 27 showing a further embodiment.

Alternatively, the length of the lower member 138 could be constant and the point of intersection with between the lower member 138 and the post 145 could be raised or lowered as shown in FIG. 31. The provision of one piece of fixed length allows a constant spacing of the guidewires 32 to be retained with the other piece accommodating changes in geometry due to the topography of the installation.

Figure 24:
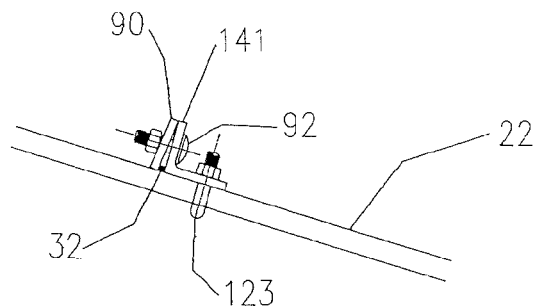
FIG. 24 is view similar to FIG. 15 of a further embodiment of securing guidewires to rafter.

In the event that the rafter 22 is made using cable or rod, FIG. 24 shows how the upstanding plate 90 used to secure the guidewires 32 can be made using an angle 141 which is secured with a U bolt 123 to the rafter 22. The guidewire 32 can then be secured to the rafter 22 either using the clamping plate 94 or the arrangement with jaws 109 and a groove 110 as shown on FIGS. 15 and 16.

Figure 29:
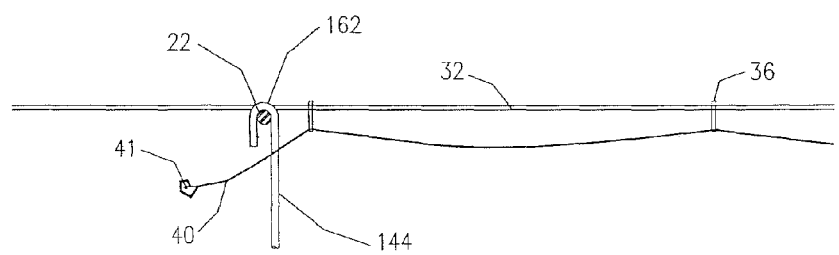
FIG. 29 is a detailed view of FIG. 23 showing the connection of the diagonal member connecting to the upper rafter section.
Figure 30:
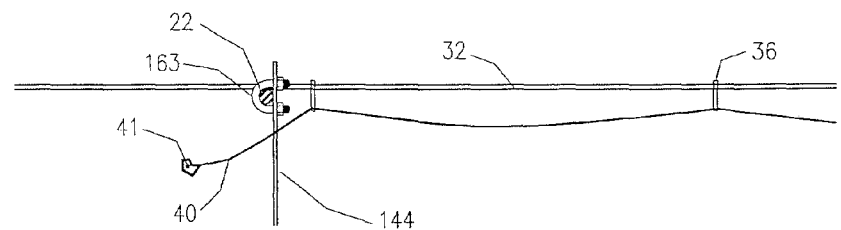
FIG. 30 is a view similar to FIG. 29 showing a further embodiment.

When the rafter 22 is made using a rod or cable, it is preferable to prevent the rafter 22 from oscillating during wind. FIG. 23 shows and additional tension member 144 extending upwardly approximately from the point where the lower rafter member intersects the post 145 until it intersects the upper rafter section 137. This member could be a rigid tube or a rod. The diagonal member 144 can be manufactured with a hook 162 which extends over the rafter 22 as can be seen in FIG. 29. Alternatively as shown in, FIG. 30 the diagonal member 144 can be attached to the rafter using a U bolt 163. In order to prevent rain from leaking through the membrane 34 where the diagonal member 144 passes through the membrane 34, the membrane should be cut where the membrane 34 is close to the guidewire 32 as opposed to a valley in the membrane 34.

When securing the trailing edge 40 to a rafter, it is critical to ensure that rain does not reach the growing area 14 where the leading edge 38 connects to the trailing edge 40 at the rafter 22. The arrangements shown in FIG. 7 and FIG. 11 may be used with a rod or cable as the rafter, rather than the tube shown in those figures.

Figure 28:
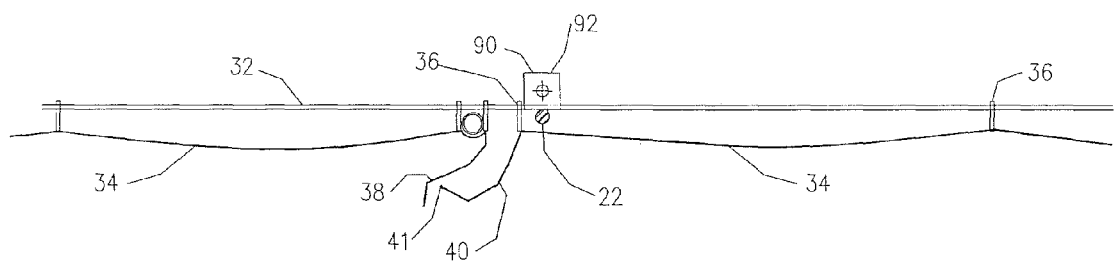
FIG. 28 is a view similar to FIG. 7 of a further embodiment.

An alternative embodiment that takes advantage of the reduced section of the rafter 22 is shown in FIG. 28 in which the hook 36 closest to the wire 41 is positioned on the guidewire 32 such that the hook 36*a* is on the same side of the rafter 22 as the guidewire 41. Again the length of the trailing edge 40 is greater distance from the hook 36*a* to the wire 41 to create a valley in the membrane to prevent the rainwater from draining towards the wire 41.

When covering field crops, certain crops like tomatoes require gutters below the apertures to collect the rainwater whereas for other crops like apricots and cherries, it is not cost effective or necessary to collect the water from the apertures in gutters. In many cases it is acceptable to protect the trees from rain by positioning them away from the apertures and to simply allow the rain to pass through the apertures onto the ground. FIG. 23 shows how a gutter 56 can be positioned below the valley 18 to collect the water which comes through the apertures in the roof. This gutter is not a structural member and so it can be simply hung off the lower sections of the rafters 138 without creating leaks in the membrane or the connections at the rafter. This method of hanging the gutters also allows a farmer to build the structure without gutters and to install them at a later date if required.

Figure 22:
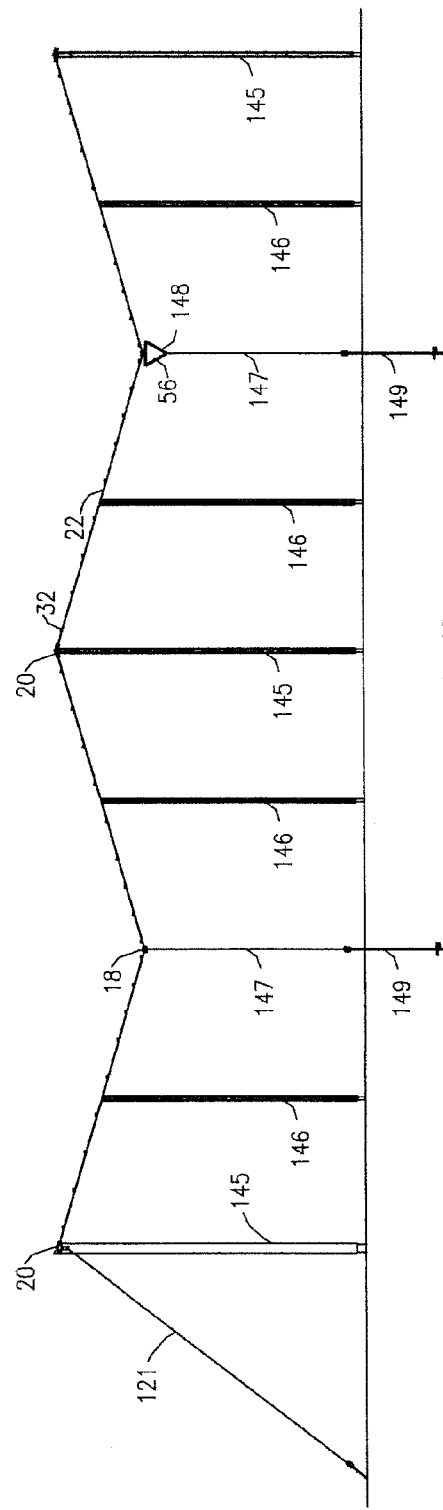
FIG. 22 is an end view of a further embodiment of the support structure for a curtain system.

As can be seen in FIG. 22, another alternate structural design maintains the use of cable or rod as the rafter 22j, but instead of a series of "X"s, one of the members connecting the rafter 22j to the ground is a member acting in tension, typically a cable or rod. The guidewires 32 are connected to the rafter 22j, but the vertical member 147 at the intersection of the rafters in the valley is pulling the valley towards the ground. In the preferred embodiment, a tensioner is built in either where the cable connects to the intersection of the rafters or where the cable is attached to the concrete footing or anchor 149 at ground level. There is a post 145 under the peak 20 from which the rafters diverge and there can be another post 146 located between the post 145 at the peak and the tension member 147 at the valley. This additional post provides additional structural support for the rafter when the distance between the peak and valley becomes excessive. The vertical tension member 147 can be bifurcated to provide an aperture similar to that shown in FIG. 4, whereby a gutter 56 can be installed directly under the apertures in the valley 18 which the vertical tension member connecting to the inclined members 30. The connection of guidewires 32 is as shown in FIG. 24.

An alternate configuration of the roof can be seen on FIG. 34 whereby the peak 20 of membrane 34 occurs at every other post 145 instead of at every post 145. In this embodiment, the rafter 137 which has the guidewires 32 attached is located both above and below the intersection point of the upper and lower section of the rafter assemblies. Rafter section 138 is adjustable in length to accommodate changes in the slope of the land. This alternate configuration provides the advantage that there is a 50% reduction in the number of valleys necessitating 50% fewer gutters required to collect the water. The disadvantage of this configuration is that it overall head clearance under the guidewires and membrane closest to the ground will be less than that shown in FIG. 20.

In conventional greenhouses with stationary roofs, it is conventional to have a clear covering on the greenhouse to allow for maximum light transmission on dark, cold days. To help minimize temperature increases on sunny warm days, retractable curtain systems using aluminized fabric are frequently installed inside so that the aluminized curtains can reflect incoming light and heat. Unfortunately, this creates the opposite effect to what is optimal. With the upper roof being clear and stationary, the heat in the winter is allowed to rise up to the peak of the greenhouse, far away from the plants. During the summer, the interior retractable curtain system is located closer to the plants, thereby allowing the heat to travel closer to the plants.

Figure 32:
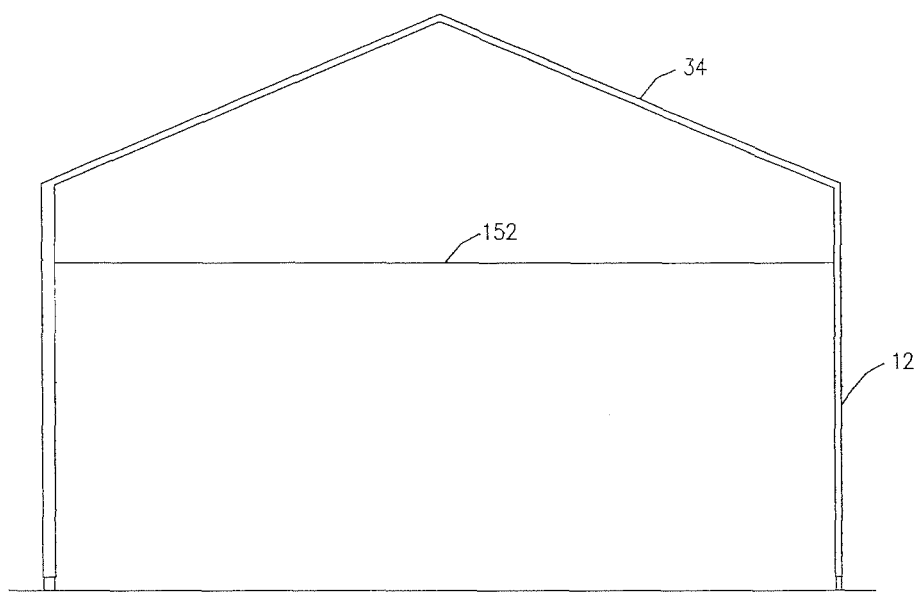
FIG. 32 is an end view showing two retractable roof membranes, one above the other.
Figure 33:
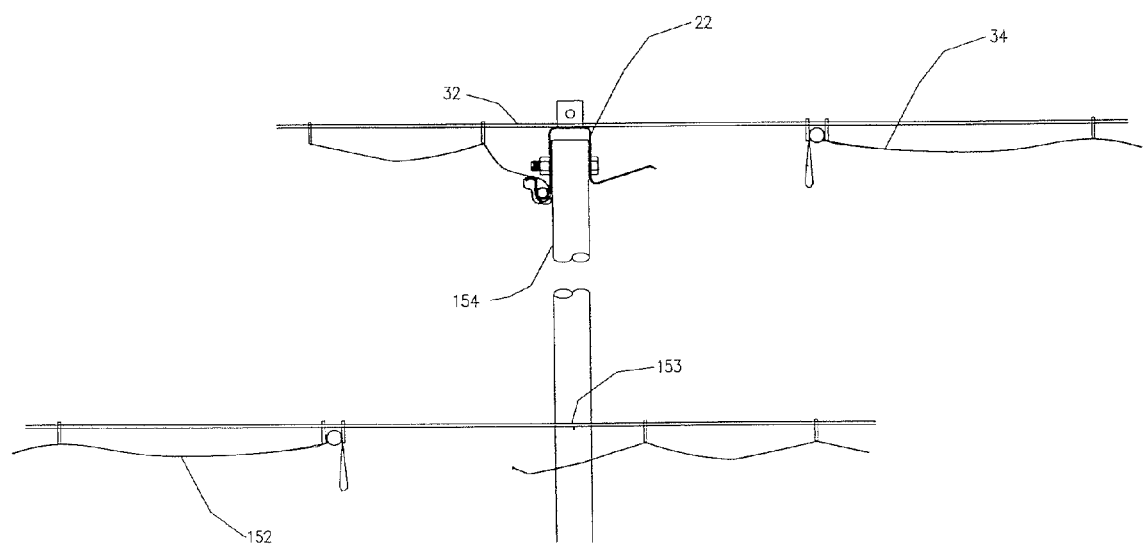
FIG. 33 is a view looking along the rafter showing the upper and lower retractable membranes travelling in opposite directions.

With a retractable roof, colors of the roof membrane and interior curtain can be reversed to create superior conditions during periods of excessive heat and cold. As can be seen in FIG. 32, the structures described above can be used to provide two retractable membranes, an upper membrane 34 having a reflective characteristic, e.g. the colored white and a lower membrane 152 being transmissive, e.g. clear. The drive systems are oriented to move the membranes in opposite directions, so a continuous cover can be provided by two partially open membranes. When the daytime temperatures are cold, the lower retractable membrane 152 is closed allowing for high light transmission since the roof is clear, with warmer temperatures being maintained inside since the clear roof is lower thereby holding heat closer to the plants. When the daytime temperatures are too hot, the upper membrane 34 which is reflective can be closed partway to intercept the infra red radiation while still allowing ventilation through the opening in the roof. The plants at ground level are cooler since the white roof is higher than the clear roof, allowing the heat to rise up to the peak of the greenhouse, making it cooler for the plants at ground level. To help prevent burning of plants which are exposed to direct sunlight since they are directly under the opening in the roof, the secondary membrane 152 can be closed partway as shown in FIG. 33 to block some of the radiation coming through the opening in the upper roof. When it is nighttime, the upper white membrane 34 is closed to help retain more heat without a loss of light since it is dark outside anyways and the lower membrane 152 is also closed to create an additional barrier to the heat escaping.

The embodiments described above, may be modified to meet particular requirements, as described below, with like reference numerals used to denote like components.

Figure 35:
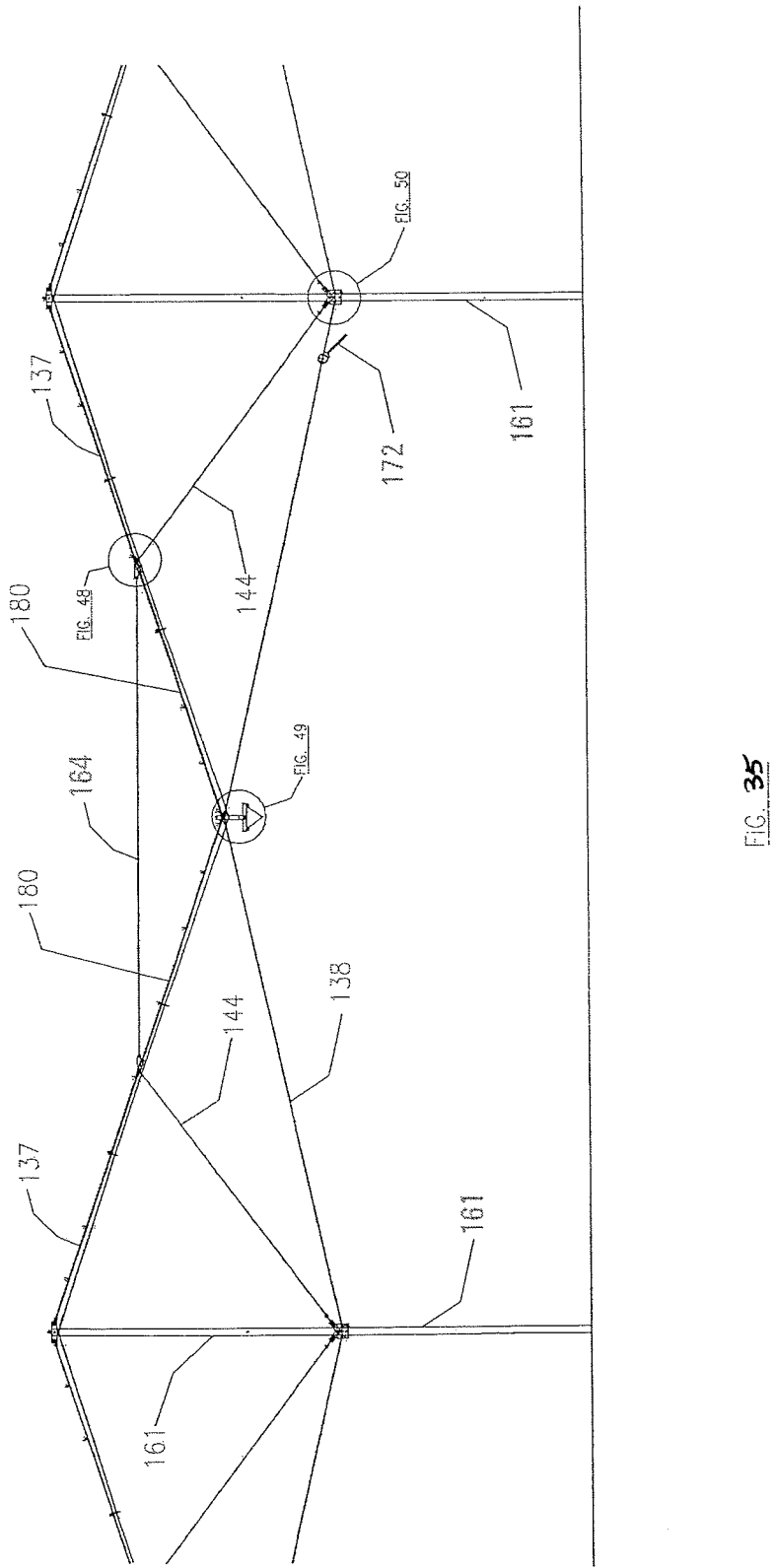
FIG. 35 is a view, similar to FIG. 23, showing a further embodiment incorporating a horizontal brace.

FIG. 35 is a view, similar to FIG. 23, showing a further embodiment whereby a horizontal brace in the foam of a rod 164 is connected between the rafters 137 where the diagonal cable 144 intersects the rafter. The horizontal brace 139 helps provide additional strength against snow loads. It also allows for tightening of the cable 144 without deflecting the rafter 137.

Figure 36:
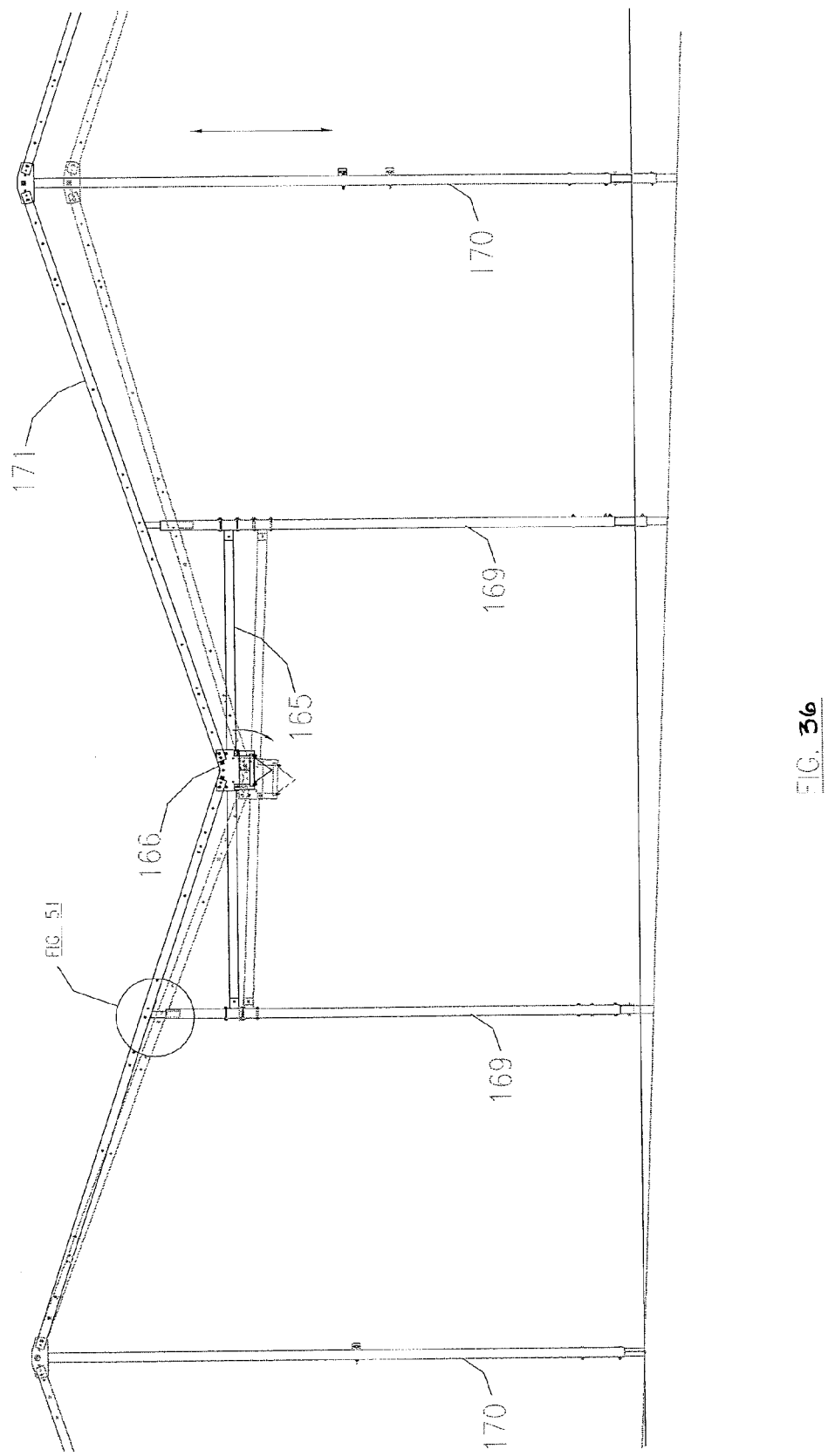
FIG. 36 is an end view of a gable end to accommodate sloping ground.

Referring to FIG. 36, the general arrangement of FIG. 31 is show applied to a tubular rafter structure. There is shown an overview of the gable end 15 of a house illustrating the impact of the slope of the land on the overall height of the rafter from the ground. The location of a bracket 166 which connects the valleys of two adjacent rafters 22 will move laterally and vertically as the slope of the land changes. To facilitate the changes in the slope, a post is omitted under the valley and instead two posts 169 are located adjacent to the valley. A horizontal member 165 is located between the posts 169 to be secured at a height which allows the mounting plate 166 to properly intersect the valleys of the rafter. The mounting plate 166 is positioned on the horizontal member 165 wherever it allows for the proper intersection with the valley of the rafters.

Figure 37:
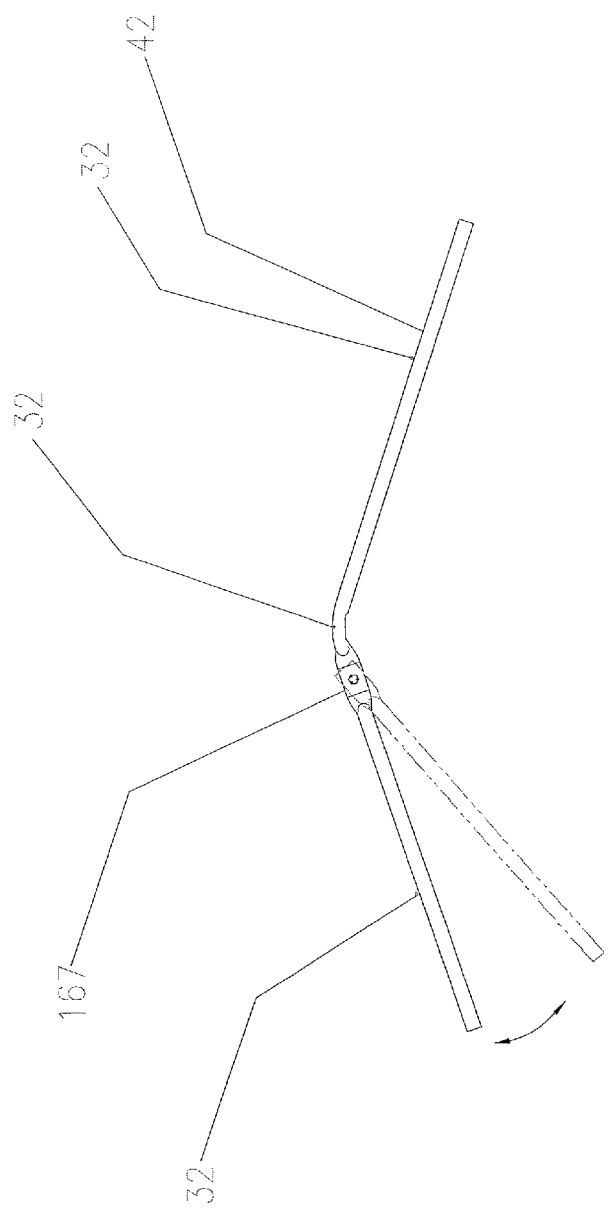
FIG. 37 is a detailed view of a hinged bar to accommodate variations in slope.

Similarly, as shown in FIG. 37, in order to accommodate the changes in the angles of the roof due changes in the slope of the land, the tube 42 provided at the leading edge of the membrane has a hinge 167 incorporated to ensure that the tube 42 is always parallel to the rafter 137. The hinge 167 is offset from the peak to maintain a clearance with the guidewire 32.

Figure 15:
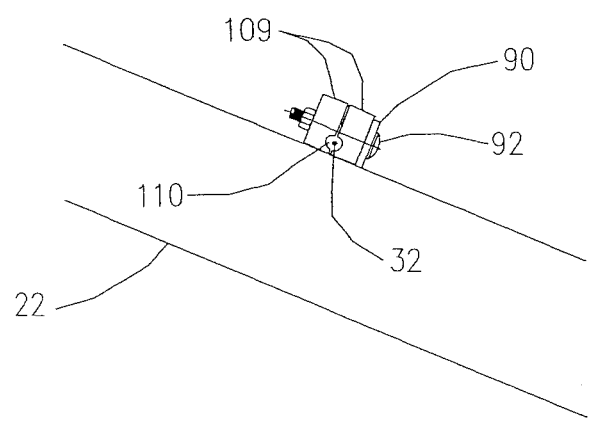
FIG. 15 is view of a method of securing guidewires to a rafter.
Figure 38:
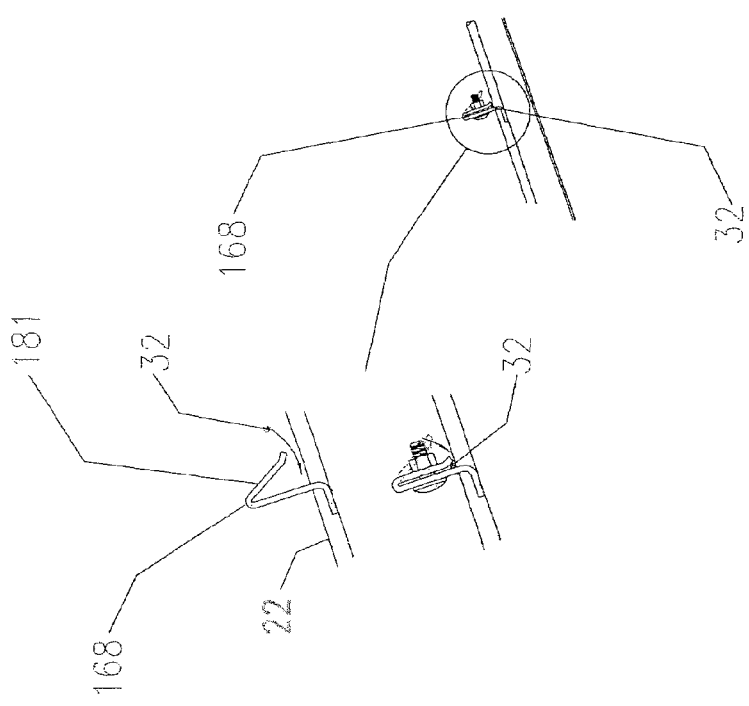
FIG. 38 is a view of an alternative embodiment of clamp shown in FIG. 15.

FIG. 38 is a further embodiment of the clamp of FIG. 15 showing a one piece design upstanding plate 168 whereby the guidewire 32 is secured to the rafter 22. The plate 168 is formed with a splayed leg 181 to allow the wire to be inserted. Once the wire is installed adjacent to the upstanding plate, a fastener 182 is tightened causing the leg 181 to flex and clamp the guidewire 32.

Figure 39:
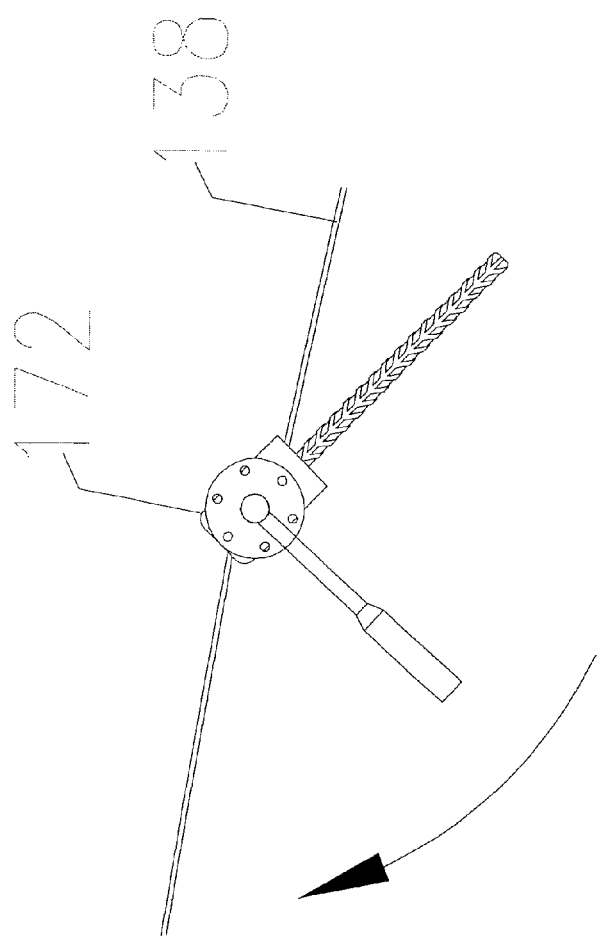
FIG. 39 is a detailed view of a tensioning tool.

FIG. 39 shows a tightener 172, indicated in FIG. 35 which is installed in line with the cable 138 but is not connected to any posts. This allows the tightener 172 to pull both ends of the cable at the same time without imposing any lateral load on an adjacent post.

Figure 40:
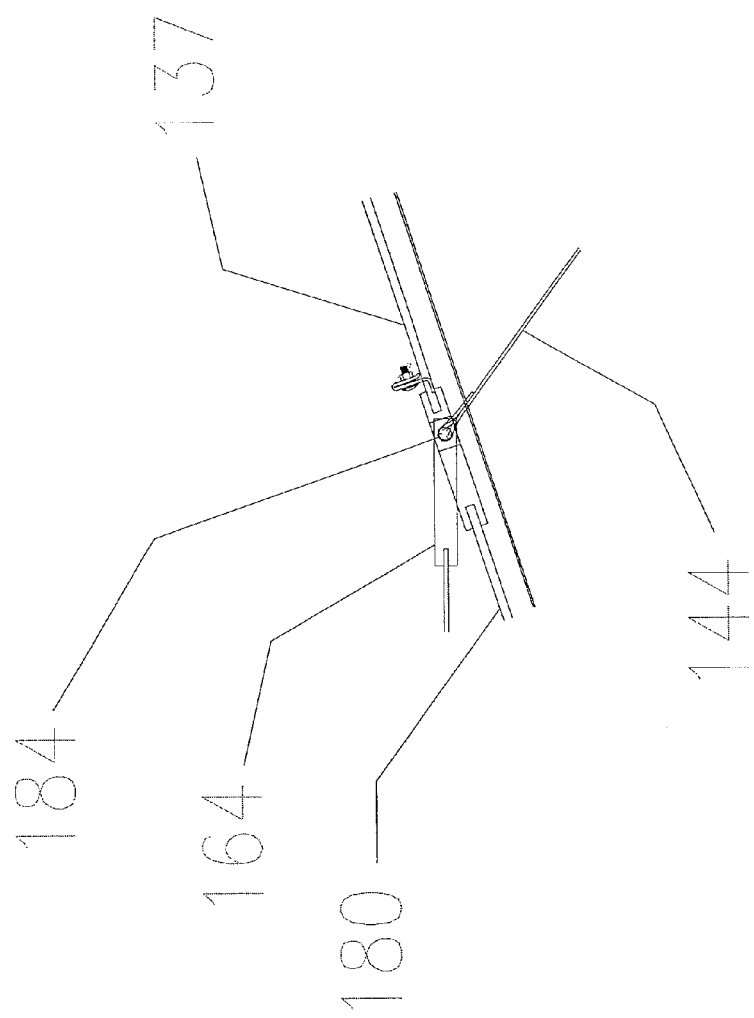
FIG. 40 is a detailed view of a connection of cables shown in FIG. 35.

FIG. 40 is a detailed view of the arrangement of FIG. 35 showing the fixed length rafter section 137 as a two piece design with the connection point located where the horizontal rod 164 and diagonal cable 144 meet. This design reduces the oscillation of the rafter 137 during high winds by reducing the overall unsupported length. In addition, the two sections of rafter intersect at a bolt 184 such that vertical movement of the rafter will cause rotation of the end of the rafter on a bolt thereby minimizing bending of the rafter.

Figure 26:
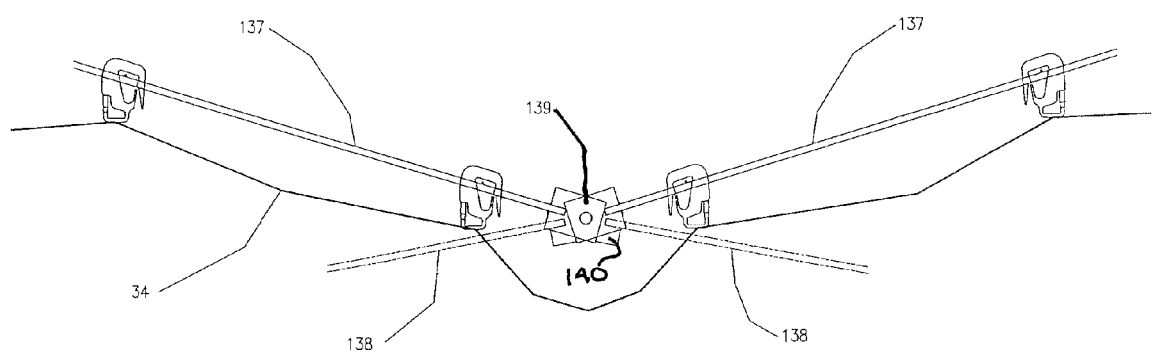
FIG. 26 is a detail view of FIG. 23 showing the intersection of the upper and lower rafter sections.
Figure 41:
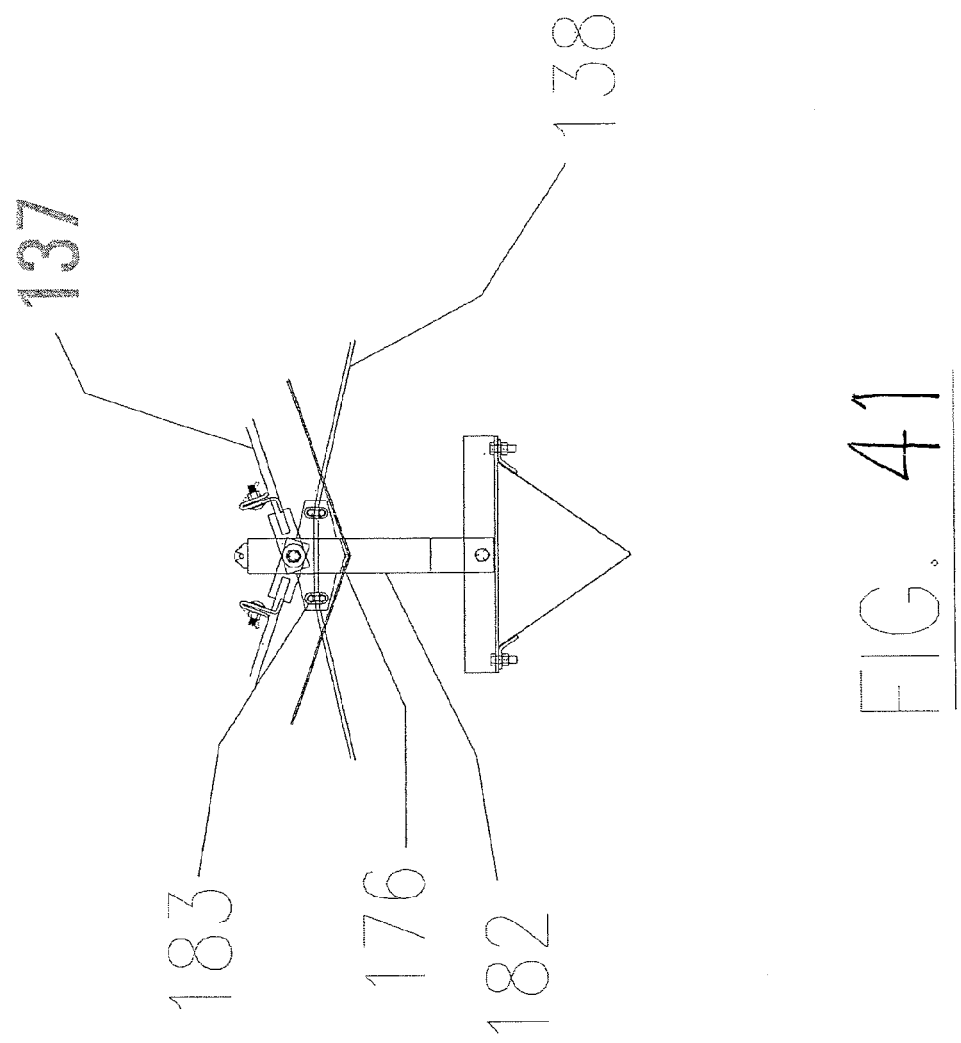
FIG. 41 is a view of a support bracket at a valley.

FIG. 41 is a further embodiment of FIG. 26 showing a bracket 182 which connects of a pair of rafters sections 137 and the with a continuous cable 138 forming the lower sections of the rafters. The cable 138 is secured to the bracket using cable clamps. The continuous cable 138 makes installation and adjustment easier since the tension in the cable 138 and the rafters 137 will be uniform throughout adjacent houses. Once the tensioning of the cable is complete, the clamps 183 are tightened causing the bracket 182 to be secured in position.

FIG. 42 is a view of a further embodiment of FIG. 27 and a more detailed view of FIG. 35 showing the connection of a continuous cable 138 acting as a lower section to the rafter. Cable clamps 179 secure the cable 138 to each post to isolate the loads. To secure and tighten the cable 144, eye bolts 175 allow for independent tightening of each cable 144 since changes in the slope of the land will cause each cable 144 to have a different length.

FIG. 43 is a detail of FIG. 36 showing a method of connecting the post 169 with the rafter 171. A connector bracket 181 is made adjustable in height so that it will compensate for differences in the height of the rafter relative to the top of the post 169.

FIG. 44 is a view showing a bracket 177 which secures a wire 41 into an aperture 178. The bracket 177 has a radius to it to prevent the membrane 34 from excessive wear by preventing the stationary edge of the membrane 40 from being in contact with any sharp corners. The bracket 177 also helps shape a valley in the membrane 40 to ensure that the water drains from the peak to the valley.

The invention claimed is:

1. A retractable roof structure comprising a pair of substantially vertical posts spaced from one another and a rafter assembly extending between said posts to support a flexible membrane, said rafter assembly comprising a pair of rafters, each secured to a respective post and inclined relative thereto, said membrane being supported on guide wires that extend transverse to said rafters, said membrane being movable along said guide wires between a retracted position and a deployed position, said rafters being formed as a tensile member and maintained in tension between said posts to support said membrane.

2. A retractable roof structure according to claim 1 wherein each of said rafters extend between said posts and are oppositely inclined.

3. A retractable roof structure according to claim 1 wherein said rafters intersect.

4. A retractable roof structure according to claim 3 wherein each of said rafters extend between said posts.

5. A retractable roof structure according to claim 4 wherein each rafter is formed as a pair of sections connected end to end, at least one of said sections having a fixed length.

6. A retractable roof structure according to claim 5 wherein another of said sections is adjustable length.

7. A retractable roof structure according to claim 6 wherein said membrane is supported on said one sections.

8. A roof according to claim 4 wherein said guidewires are attached to the section of rafter located above the intersection point of two rafters such that the valley of the membrane is located approximately midspan between two adjacent posts.

9. A roof according to claim 4 wherein said guidewires are attached to said rafter located below the intersection point of the two rafters such that the valley of the membrane is located at or adjacent said posts.

10. A roof according to claim 9 wherein a gutter is supported on the lower section of the rafter below the intersection point of the rafters.

11. A roof according to claim 4 wherein said guidewires are attached to the upper and lower section of a pair of rafter assemblies such that the pair of said rafters are generally parallel and in line with one another.

12. A roof according to claim 11 wherein a gutter is supported on the lower section of the rafter below the intersection point of the rafters.

13. A roof according to claim 4 wherein a member extends upwardly from the approximate intersection point of the lower section of said rafter with said post, said member connecting to the upper section of said rafter assembly.

14. A retractable roof structure according to claim 3 wherein a tie wire extends between said rafters at a location spaced from the intersection of said rafters.

15. A retractable roof structure according to claim 14 wherein opposite ends of said tie wire are secured to respective ones of said posts.

16. A retractable roof structure according to claim 1 wherein said membrane is supported on said guide wires by hooks, and said hooks supporting said membrane adjacent to said rafter assembly are restricted from moving along said wires.

17. A retractable roof structure according to claim 16 wherein a trailing edge of said membrane contains sufficient material such that it may pass beneath said rafter assembly and form a valley parallel to the rafter assembly.

18. A retractable roof structure comprising a plurality of spaced parallel rafter assemblies located between a pair of end walls, each rafter assembly having a pair of oppositely directed rafters and diverging downwardly from a peak to a respective one of a pair of laterally spaced supports, a plurality of guides extending between said rafter assemblies at spaced locations and including spaced parallel wires extending generally normal to and supported by said rafters, a flexible roof membrane extending between said rafter assemblies, said membrane being suspended from said wires so as to be slidable along said wires between a deployed position in which said membrane extends between said rafter assemblies to cover the area therebetween and a retracted position in which the area between said rafter assemblies is substantially uncovered, said wires being secured to at least one of said rafters such that movement of said wires vertically and laterally is inhibited without limiting the movement of the wire longitudinally across said rafter.

19. A roof structure according to claim 18 wherein said wires are secured to other of said rafters to inhibit longitudinal movement between said wire and said rafter.

20. A roof structure according to claim 18 where said one rafter is adjacent one of said end walls.

21. A retractable roof structure comprising a pair of spaced parallel rafter assemblies each having a pair of oppositely directed rafters diverging downwardly from a peak to a respective one of a pair of laterally spaced supports, a plurality of guides extending between said rafter assemblies at spaced locations and including spaced parallel wires extending generally normal to and supported by said rafters, a flexible roof membrane extending between said rafter assemblies, said membrane being slidably supported on said wires and slidable between a deployed position in which said membrane extends between said rafter assemblies to cover the area therebetween and a retracted position in which the area between said rafter assemblies is substantially uncovered, one end of said membrane being secured to one of said rafter assemblies and an opposite end being movable toward and away from the other of said rafter assemblies between said deployed position and said retracted position, a drive system to move said membrane between said retracted position and said deployed position, said drive system including a rotating tube mounted above one of said rafters, a pulley mounted above the other of said rafters and an endless drive member extending between said rotating tube and about said pulley and connected to said membrane, said rotating tube being positioned relative to said rafter to provide unimpeded access of said membrane to said rafter, wherein the membrane adjacent to the rotating tube is capable of becoming engaged with the rafter when the membrane is in a closed position.

22. A roof according to claim 21 wherein said endless drive member includes a cable attached to the rotating tube with upper and lower runs of said cable extending from said tube about said pulley and a spring is connected to said lower run of cable, said spring contracting when the cable tension drops.

23. A roof according to claim 22 wherein cable clamps are attached to the lower cable to receive each end of said spring.

24. A retractable roof structure according to claim 21 wherein a secondary membrane is secured to said rafter and extends from said rafter to underlie said membrane in said closed position.

25. A retractable roof structure comprising posts with a series of pairs of rafters formed by tensile members maintained in tension and extending diagonally down from opposite faces of said post to a valley, the lower end of each rafter being connected to a vertical member which is connected to the ground intermediate said posts, said vertical member capable of exerting a downward pull on said lower end of a respective one of said rafters, said rafters acting as spaced parallel rafter assemblies, a plurality of guides extending between said rafter assemblies at spaced locations and including spaced parallel wires extending generally normal to and supported by said rafters, a flexible roof membrane extending between said rafter assemblies, said membrane being suspended from said wires and slidable along said wires between a deployed position in which said membrane extends between said rafter assemblies to cover the area therebetween and a retracted position in which the area between said rafter assemblies is substantially uncovered, one end of said membrane being secured to one of said rafter assemblies and an opposite end being movable toward and away from the other of said rafter assemblies.

26. A roof according to claim 25 wherein said rafters are made of cable.

27. A roof according to claim 25 wherein said rafters are made of rod.

28. A roof structure according to claim 25 wherein one or more supplementary posts are located in line with the rafter and in between said post and said vertical member.

29. A roof structure according to claim 25 wherein said membrane is supported on said wires by hooks, and said hooks supporting said membrane adjacent to said rafter are restricted from moving along said wires.

30. A roof structure according to claim 29 wherein the trailing edge of said membrane contains sufficient material such that it may pass beneath said rafter and form a valley parallel to the rafter.

31. A roof structure according to claim 25 wherein said vertical member is located at said valley and is bifurcated to allow a gutter to be located continuously under drainage apertures in said membrane.

32. A retractable roof structure comprising a pair of spaced parallel rafter assemblies each having a pair of oppositely directed rafters formed by tensile members maintained in tension and diverging downwardly from a peak to a respective one of a pair of laterally spaced supports, a plurality of guide means extending between said rafter assemblies at spaced locations and including spaced parallel wires extending generally normal to and supported by said rafters, a flexible roof membrane extending between said rafter assemblies said membrane being suspended from said wires to be slidable along said wires between a deployed position in which said membrane extends between said rafter assemblies to cover the area therebetween and a retracted position in which the area between said rafter assemblies is substantially uncovered, one end of said membrane being secured to one of said rafter assemblies and an opposite end being movable toward and away from the other of said rafter assemblies, with a second retractable membrane located below upper membrane and extending between said rafters so as to be juxtaposed with said upper membrane, said upper membrane colored white for cooling and said lower membrane being transparent to help hold warmer temperatures closer to crops.

33. A roof according to claim 32 wherein the upper roof membrane and the lower interior retractable membrane close in opposite directions.

* * * * *